United States Patent
Takamatsu

(10) Patent No.: US 11,584,388 B2
(45) Date of Patent: Feb. 21, 2023

(54) DRIVING CONTROL METHOD AND DRIVING CONTROL APPARATUS

(71) Applicants: Nissan Motor Co., Ltd., Yokohama (JP); Renault S.A.S., Boulogne-Billancourt (FR)

(72) Inventor: Yoshiro Takamatsu, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 133 days.

(21) Appl. No.: 16/754,971

(22) PCT Filed: Oct. 10, 2017

(86) PCT No.: PCT/JP2017/036697
§ 371 (c)(1),
(2) Date: Apr. 9, 2020

(87) PCT Pub. No.: WO2019/073526
PCT Pub. Date: Apr. 18, 2019

(65) Prior Publication Data
US 2020/0298877 A1    Sep. 24, 2020

(51) Int. Cl.
*B60W 60/00* (2020.01)
*G06V 20/56* (2022.01)

(52) U.S. Cl.
CPC .......... *B60W 60/001* (2020.02); *G06V 20/56* (2022.01); *B60W 2554/4042* (2020.02); *B60W 2554/4049* (2020.02)

(58) Field of Classification Search
CPC .... B60W 30/08; B60W 30/09; B60W 30/095; B60W 30/0953; B60W 30/0956; B60W 40/02; B60W 40/04; B60W 40/105; B60W 60/001; B60W 60/0011; B60W 60/0015; B60W 60/0017; B60W 60/0027;
(Continued)

(56) References Cited

U.S. PATENT DOCUMENTS 10,262,534 B2 *   4/2019   Okada ..................... B60T 7/042
10,679,502 B2 *   6/2020   Baba ..................... B60W 10/18
(Continued)

FOREIGN PATENT DOCUMENTS

JP    H10-166976 A    6/1998
JP    2009-245120 A    10/2009
(Continued)

*Primary Examiner* — Russell Frejd
*Assistant Examiner* — Brandon Z Willis
(74) *Attorney, Agent, or Firm* — Young Basile Hanlon & MacFarlane, P.C.

(57) ABSTRACT

A driving control method is provided in which a processor configured to control driving of a vehicle acquires detection information around a vehicle on the basis of a detection condition that can be set for each point; extracts events which the vehicle encounters, on the basis of the detection information; creates a driving plan in which a driving action is defined for each of the events on the basis of the detection information acquired in the events; executes a driving control instruction for the vehicle in accordance with the driving plan; and determines the detection condition on the basis of the content of the driving action defined for each of the events.

20 Claims, 16 Drawing Sheets

(58) Field of Classification Search
CPC ..... B60W 60/00272; B60W 60/00274; B60W 60/00276; B60W 2520/10; B60W 2552/53; B60W 2552/45; B60W 2554/4029; B60W 2554/4042; B60W 2554/4044; B60W 2554/4049; B60W 2554/4041; B60W 2720/10; B60W 2710/18; G06K 9/00798; G06K 9/00825; G06K 9/00791; G06K 9/00818; G06K 9/00805; G08G 1/16; G08G 1/166

See application file for complete search history.

(56) References Cited

U.S. PATENT DOCUMENTS

| | | | |
|---|---|---|---|
| 2011/0025529 A1* | 2/2011 | Uechi | G08G 1/096783 340/905 |
| 2012/0206483 A1* | 8/2012 | Funabashi | G09B 29/10 345/629 |
| 2012/0218093 A1* | 8/2012 | Yoshizawa | G08G 1/163 340/435 |
| 2016/0114800 A1* | 4/2016 | Shimizu | B60W 30/18154 701/70 |
| 2018/0194364 A1 | 7/2018 | Asakura et al. | |
| 2018/0203454 A1 | 7/2018 | Aoki et al. | |

FOREIGN PATENT DOCUMENTS

| | | |
|---|---|---|
| JP | 2010-096584 A | 4/2010 |
| JP | 2011-096105 A | 5/2011 |
| WO | 2017/010264 A1 | 1/2017 |
| WO | 2017/013749 A1 | 1/2017 |

* cited by examiner

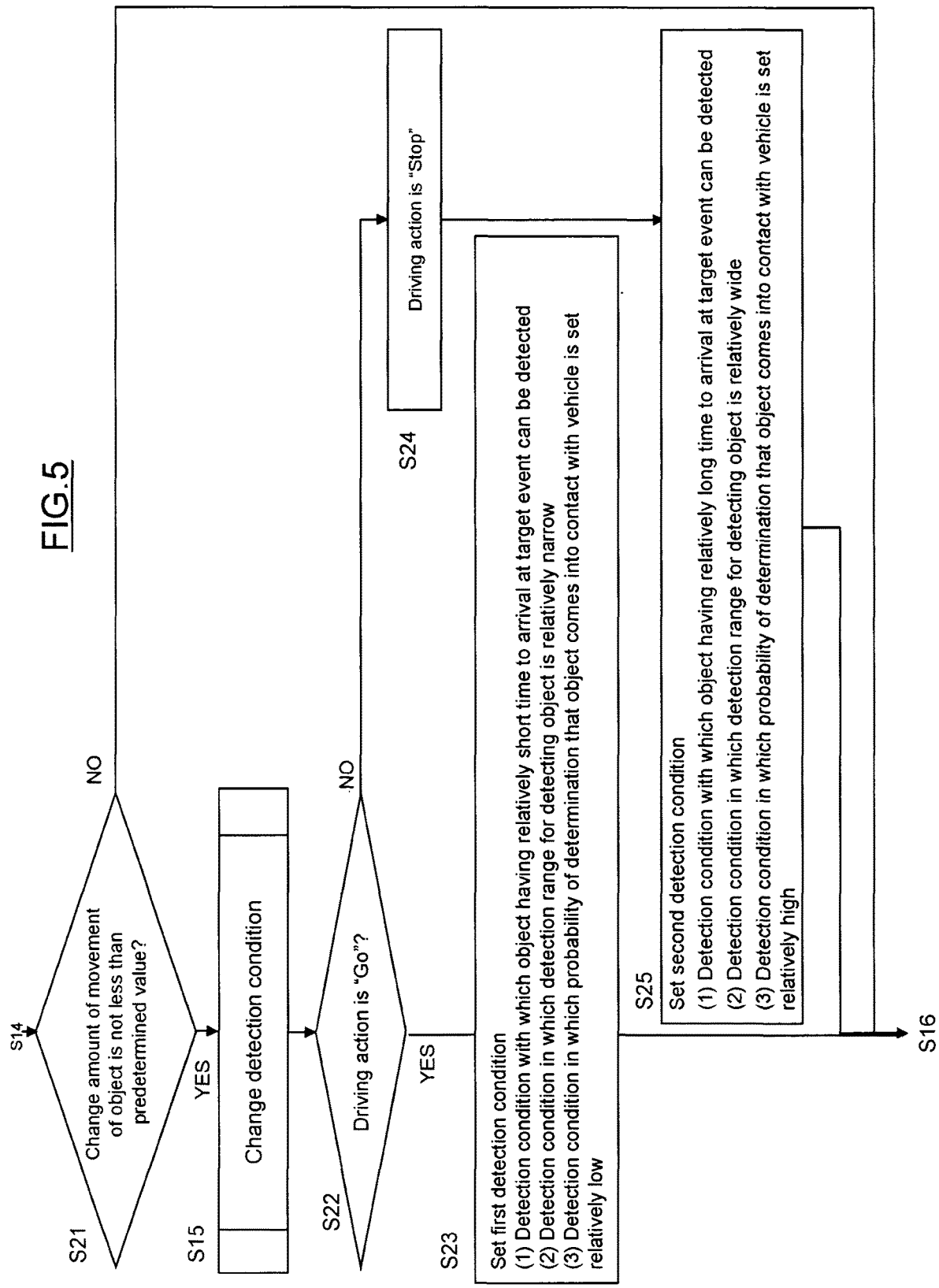

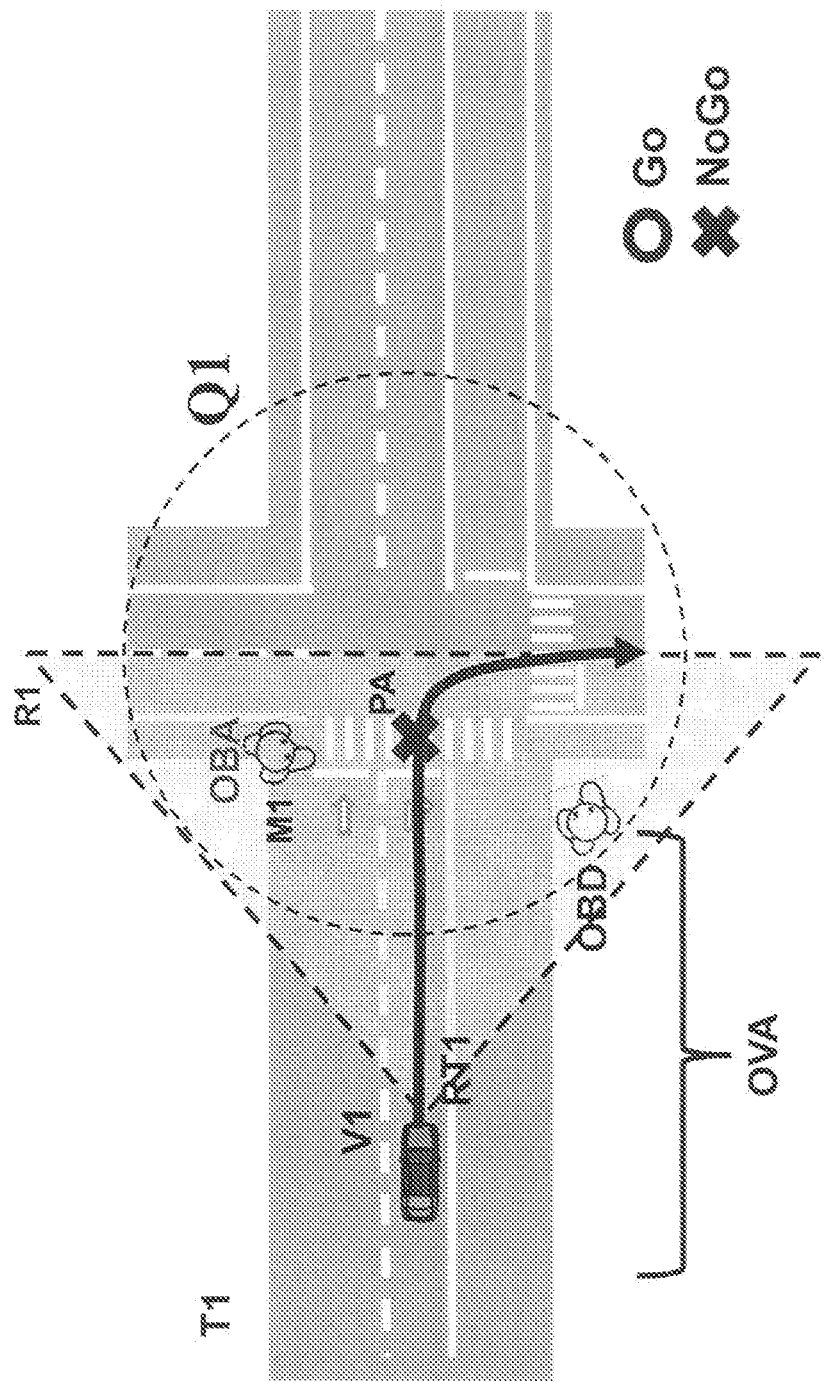

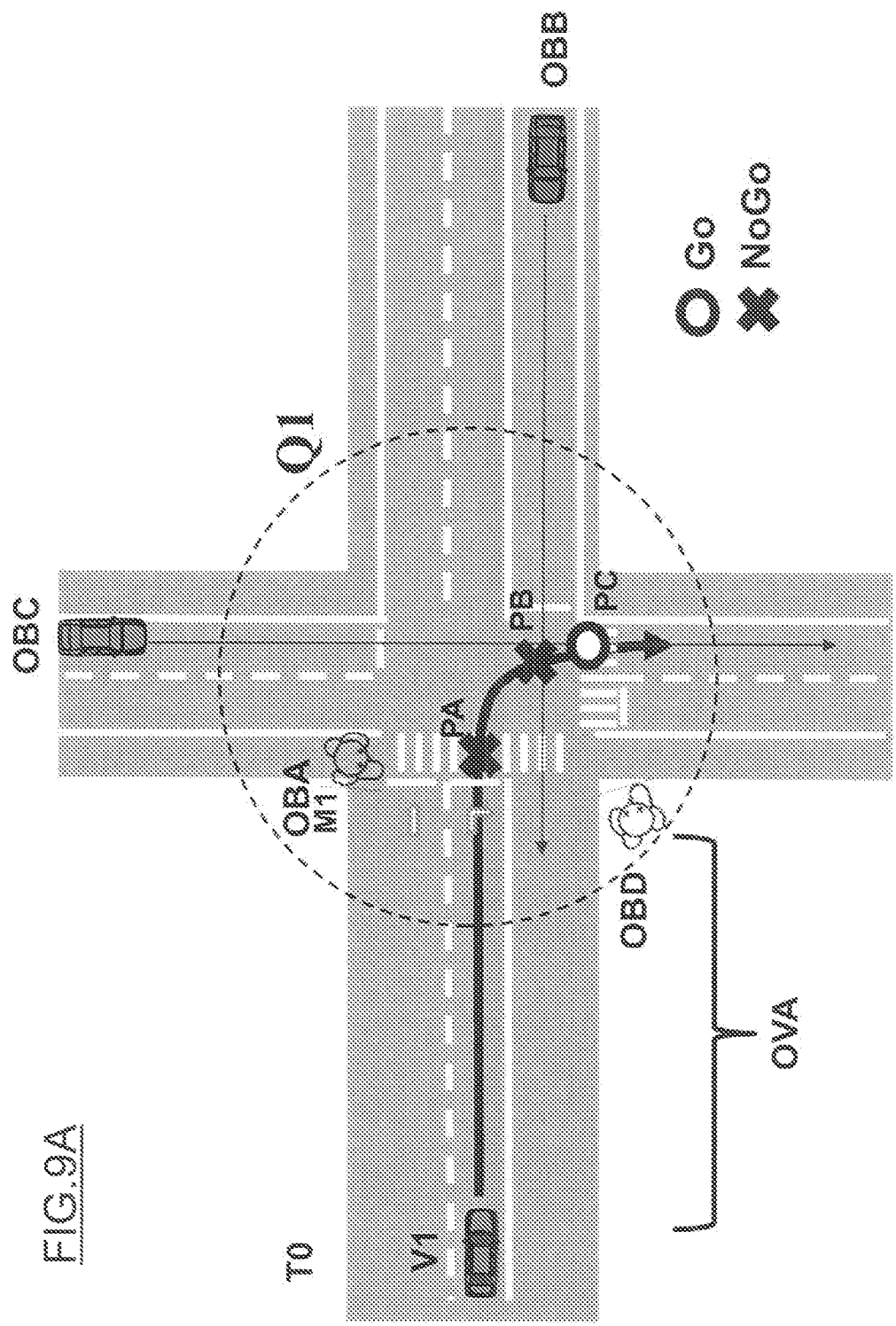

DRIVING CONTROL METHOD AND DRIVING CONTROL APPARATUS

TECHNICAL FIELD

The present invention relates to a driving control method and a driving control apparatus.

BACKGROUND

With regard to this kind of apparatus, a technique using multiscale recognition is known. This technique includes calculating a set of traffic lines of a vehicle and an obstacle, estimating a risk in each traffic line based on existing probabilities of the vehicle and the obstacle at a point of intersection of their routes, and selecting a driving action (Patent Document 1: JP2011-96105A).

SUMMARY

In the above prior art, however, a number of traffic lines of the vehicle and obstacle are created as the traffic lines are subdivided by the multiscale recognition; therefore, the number of objects to be processed will be considerably large and it may be difficult to determine the driving action in real time. When detection conditions for the vehicle and obstacle are uniform, the processing load is constantly high and a problem thus arises in that real-time determination becomes more difficult.

A problem to be solved by the present invention is to set a detection condition in accordance with a driving action in each of events which the vehicle traveling along a route encounters sequentially.

The present invention provides a scheme that includes extracting events which the vehicle encounters, on the basis of detection information acquired in accordance with a detection condition and creating a driving plan in which a driving action is defined for each of the extracted events. In this scheme, the above problem is solved by determining the detection condition on the basis of the content of the driving action defined for each of the events.

According to the present invention, the content and amount of the detection information are controlled in accordance with the driving action and, therefore, an accurate driving plan based on real-time determination can be created by acquiring necessary information even while reducing the processing load.

BRIEF DESCRIPTION OF THE DRAWINGS

FIG. 5 is a flowchart illustrating a subroutine associated with step S15 of the control procedure illustrated in FIG. 3;

FIG. 6B is a second diagram for describing the first example of the method of determining a detection condition;

FIG. 9A is a first diagram for describing a fourth example of the method of determining a detection condition;

DETAILED DESCRIPTION

Hereinafter, one or more embodiments of the present invention will be described with reference to the drawings. In the embodiments, the present invention will be described by exemplifying a case in which the driving control method and driving control apparatus according to the present invention are applied to a driving control system that is responsible for cooperation with an onboard apparatus 200 equipped in a vehicle.

Figure 1:
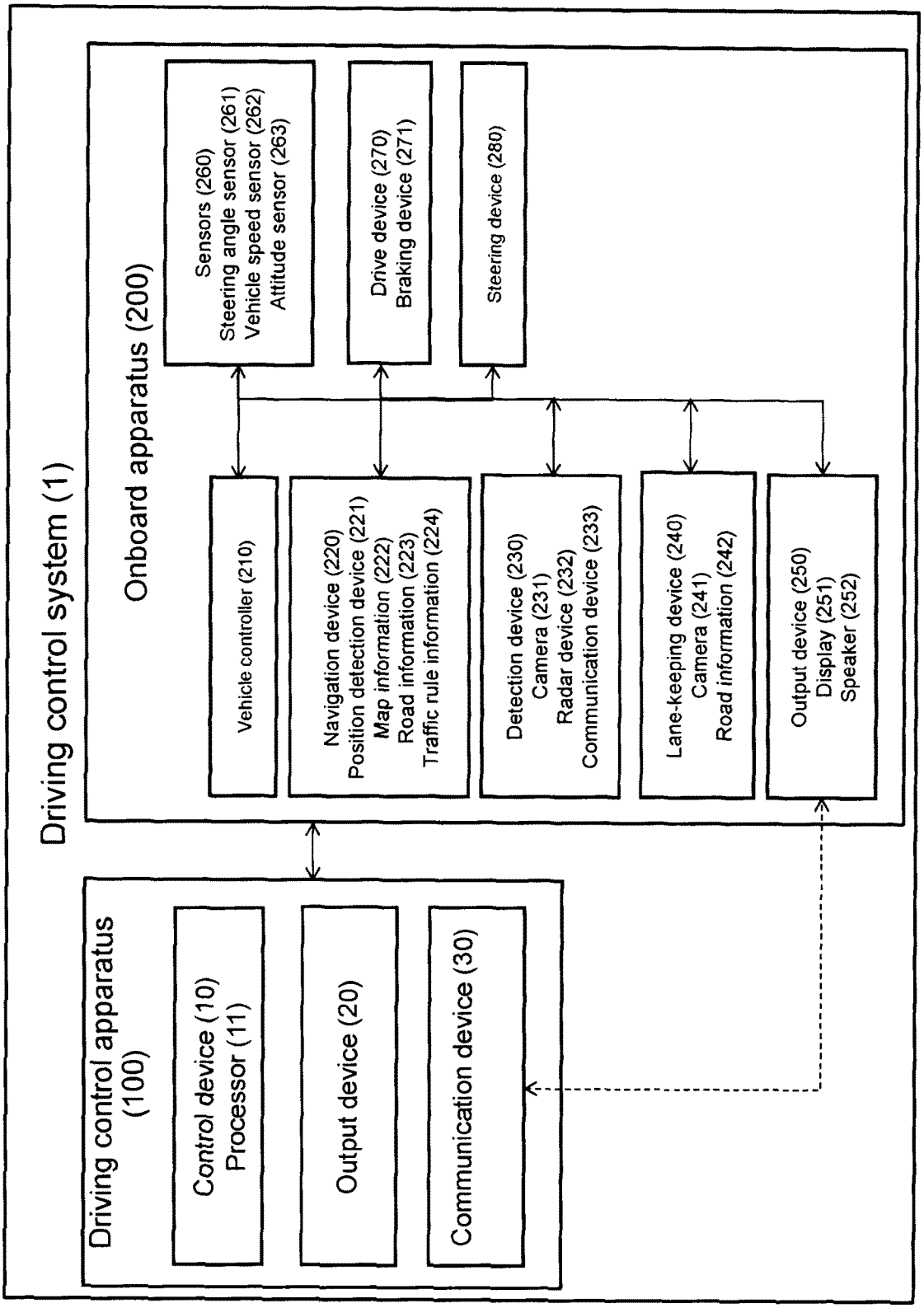
FIG. 1 is a block diagram of a driving control system according to one or more embodiments of the present invention.

FIG. 1 is a diagram illustrating a block configuration of a driving control system 1 according to one or more embodiments of the present invention. The driving control system 1 includes a driving control apparatus 100 and the onboard apparatus 200. In the present invention, the form of embodying the driving control apparatus 100 is not limited. The driving control apparatus 100 may be equipped in a vehicle or may also be applied to a portable terminal device that can exchange information with the onboard apparatus 200. Examples of the terminal device include equipment, such as a smartphone or a PDA. The driving control system 1, the driving control apparatus 100, the onboard apparatus 200, and various modules provided therein may each be a computer that includes an arithmetic processing unit, such as one or more CPUs, and executes calculation processes.

The onboard apparatus 200 will be described first.

The onboard apparatus 200 according to one or more embodiments of the present invention includes a vehicle controller 210, a navigation device 220, a detection device 230, a lane-keeping device 240, and an output device 250. These devices which constitute the onboard apparatus 200 are connected to one another via a controller area network (CAN) or other onboard LAN to mutually exchange information. The onboard apparatus 200 can exchange information with the driving control apparatus 100 via such an onboard LAN.

The vehicle controller 210 according to one or more embodiments of the present invention controls the driving of the vehicle in accordance with the driving plan created by a processor 11. The vehicle controller 210 operates sensors 260, a drive device 270, and a steering device 280. The vehicle controller 210 acquires vehicle information from the sensors 260. The sensors 260 include a steering angle sensor 261, a vehicle speed sensor 262, and an attitude sensor 263. The steering angle sensor 261 detects information, such as a steering amount, a steering speed, and steering acceleration, and outputs the information to the vehicle controller 210. The vehicle speed sensor 262 detects a speed and/or acceleration of the vehicle and outputs the detection result to the vehicle controller 210. The attitude sensor 263 detects a position of the vehicle, a pitch angle of the vehicle, a yaw angle of the vehicle, and a roll angle of the vehicle and outputs them to the vehicle controller 210. The attitude sensor 263 includes a gyrosensor.

The vehicle controller 210 according to one or more embodiments of the present invention is an onboard computer, such as an electric control unit (ECU), and electronically controls the driving/operation of the vehicle. The vehicle may be, for example, an electric car having an electric motor as the traveling drive source, an engine car having an internal-combustion engine as the traveling drive source, or a hybrid car having both an electric motor and an internal-combustion engine as the traveling drive sources. Examples of the electric car and hybrid car having an electric motor as the traveling drive source include a type in which the power source for the electric motor is a secondary battery and a type in which the power source for the electric motor is a fuel cell.

The drive device 270 according to one or more embodiments of the present invention includes a drive mechanism of the vehicle. The drive mechanism includes an electric motor and/or an internal-combustion engine as the above-described traveling drive sources, a power transmission device including a drive shaft and an automatic transmission that transmit the output of the traveling drive source or sources to the drive wheels, and a braking device 271 that brakes wheels. The drive device 270 generates respective control signals for these components of the drive mechanism and executes the driving control including acceleration and deceleration of the vehicle. These control signals for the drive mechanism are generated on the basis of input signals by an accelerator operation and a brake operation and control signals acquired from the vehicle controller 210 or from the driving control apparatus 100. Control information is sent to the drive device 270, which can thereby perform the driving control including acceleration and deceleration of the vehicle in an autonomous manner (the concept of an "autonomous manner" encompasses the concept of an "automated manner," i.e., the concept of "autonomous driving (or traveling)" encompasses the concept of "automated driving (or traveling)"). In the case of a hybrid car, the drive device 270 may receive a ratio of the torque output to the electric motor and the torque output to the internal-combustion engine in accordance with the traveling state of the vehicle.

The steering device 280 according to one or more embodiments of the present invention includes a steering actuator. The steering actuator includes a motor and other necessary components attached to the steering column shaft. The steering device 280 executes control of varying the traveling direction of the vehicle on the basis of a control signal acquired from the vehicle controller 210 or an input signal by the steering operation. The vehicle controller 210 sends control information, including a steering amount, to the steering device 280 thereby to execute the control of varying the traveling direction. Control of the drive device 270 and/or control of the steering device 280 may be performed in a completely autonomous manner or in a form of assisting with the drive operation (traveling operation) by the driver. Control of the drive device 270 and control of the steering device 280 can be suspended/canceled due to an intervention operation by the driver.

The onboard apparatus 200 according to one or more embodiments of the present invention includes the navigation device 220. The navigation device 220 calculates a route from the current position of the vehicle to a destination using a known scheme at the time of filing of the present application. The calculated route is sent to the vehicle controller 210 to be used for the driving control of the vehicle. The calculated route is output as route guidance information via the output device 250, which will be described later. The navigation device 220 includes a position detection device 221. The position detection device 221 includes a receiver for the Global Positioning System (GPS) and detects a traveling position (latitude and longitude) of the vehicle traveling.

The navigation device 220 possesses accessible map information 222, road information 223, and traffic rule information 224. It suffices that the map information 222, road information 223, and traffic rule information 224 can be read by the navigation device 220, and they may be provided as information items that are physically separated from the navigation device 220 or may also be stored in a server that is readable via a communication device 30 (or a communication device provided in the onboard apparatus 200). The map information 222 is a so-called electronic map that represents information in which the latitude and longitude are associated with the map information. The map information 222 has the road information 223 which is associated with each point.

The road information 223 is defined by nodes and links connecting between nodes. The road information 223 includes information that specifies a road by a position/region of the road, the type of a road, the road width of a road, and shape information of a road. The road information 223 is stored such that identification information of each road link is associated with the position of an intersection, the entering direction into the intersection, the type of the intersection, and other information regarding the intersection. Intersections include merging points and branching points. The road information 223 is also stored such that identification information of each road link is associated with the road type, road width, road shape, whether or not the straight-ahead traveling is permitted, the priority relationship in traveling, whether or not the overtaking is permitted (whether or not the lane change to an adjacent lane is permitted), and other information regarding the road.

The navigation device 220 specifies a first route along which the vehicle travels, on the basis of the current position of the vehicle detected by the position detection device 221. The first route may be a route to the destination that is designated by the user or may also be a route to the destination that is estimated on the basis of the travel history of the vehicle/user. The first route along which the vehicle travels may be specified for each road, specified for each link on which the inbound/outbound direction is specified, and/or specified for each lane in which the vehicle actually travels. The navigation device 220 refers to the road information 223, which will be described later, to specify the first route along which the vehicle travels. The first route may be specified using one or more links and one or more lanes.

The first route includes specific information (coordinate information) of one or more points through which the vehicle will pass in the future. The first route includes at least a point that indicates a traveling position at which the vehicle will be located in the future. The first route may be composed of a continuous line or may also be composed of discrete points. Although not particularly limited, the first route is specified by a road identifier, a lane identifier, a node identifier, and/or a link identifier. These road identifier, lane identifier, node identifier, and link identifier are defined in the map information 222 and/or the road information 223.

The traffic rule information 224 represents traffic rules on the route, such as STOP, NO PARKING, NO STOPPING, SLOW (YIELD or GIVE WAY), and SPEED LIMIT, which the vehicle must follow when traveling. Each rule is defined for each point (latitude and longitude) and each link. The traffic rule information 224 may include information on traffic signals that is acquired from an apparatus provided on the road side.

The onboard apparatus 200 includes the detection device 230. The detection device 230 acquires detection information around the vehicle which is traveling along the route. The detection device 230 of the vehicle detects the existence and existing positions of objects including obstacles that exist around the vehicle. Although not particularly limited, the detection device 230 includes a camera 231. The camera 231 is, for example, an imaging device including an imaging element, such as a CCD. The camera 231 may also be an infrared camera or a stereo camera. The camera 231 is disposed at a certain position of the vehicle and captures images of objects around the vehicle. The term "around the vehicle" as used herein encompasses the concepts of "ahead of the vehicle," "behind the vehicle," "sideways ahead of the vehicle," and "sideways behind the vehicle." Objects include two-dimensional signs such as stop lines painted on the road surface. Objects include three-dimensional physical objects. Objects include stationary objects such as traffic signs. Objects include moving objects such as pedestrians, two-wheel vehicles, and four-wheel vehicles (other vehicles). Objects include road structures such as guardrails, median strips, and curbstones.

In addition or alternatively, the detection device 230 may analyze the image data and identify the type of an object on the basis of the analysis result. The detection device 230 uses a pattern matching technique or the like to identify whether or not the object included in the image data is a vehicle, a pedestrian, or a traffic sign. The detection device 230 processes the acquired image data to obtain the distance from the vehicle to the object existing around the vehicle on the basis of the position of the object. The detection device 230 obtains the time required for the vehicle to reach the object on the basis of the position of the object existing around the vehicle and the time.

In addition or alternatively, the detection device 230 may use a radar device 232. Examples of the radar device 232 for use include those, such as millimeter-wave radar, laser radar, ultrasonic radar, and a laser rangefinder, which are of schemes known at the time of filing of the present application. The detection device 230 detects the presence or absence of objects, positions of the objects, and distances to the objects on the basis of the received signals from the radar device 232. The detection device 230 may detect the presence or absence of objects, positions of the objects, and distances to the objects on the basis of the clustering results of point cloud information which the radar device acquires.

The detection device 230 may acquire the detection information from external devices via a communication device 233. When the communication device 233 is capable of vehicle-to-vehicle communication between the vehicle and another vehicle, the detection device 230 may acquire the vehicle speed and acceleration of the other vehicle which are detected by the vehicle speed sensor of the other vehicle, as object information that represents the existence of the other vehicle. As will be understood, the detection device 230 can also acquire the object information, which includes the position, speed, and acceleration of another vehicle, from external devices of the Intelligent Transport Systems (ITS). The detection device 230 may acquire information on the surroundings of the vehicle on the onboard apparatus 200 side and may acquire information on a region farther from the vehicle than a predetermined distance from external devices provided on the roadside via the communication device 233.

The detection device 230 sequentially outputs the detection results to the processor 11.

Acquisition of the above-described detection information, that is, the detection process, is executed on the basis of a predetermined detection condition. The detection condition is a condition that can be set for each point. The processor 11 calculates the detection condition and commands the detection device 230 to set the detection condition.

The detection device 230 can set the detection condition for each point. The point may be a point (positional information) defined in an event or may also be any point on the first route. The processor 11 includes information on the point in the detection condition to be set.

The onboard apparatus 200 according to one or more embodiments of the present invention includes the lane-keeping device 240. The lane-keeping device 240 includes a camera 241 and road information 242. The camera 231 of the detection device may be shared as the camera 241. The road information 223 of the navigation device may be shared as the road information 242. The lane-keeping device 240 detects a lane, in which the vehicle travels, of the first route from the images captured by the camera 241. The lane-keeping device 240 has a lane departure prevention function (lane-keeping support function) for controlling the movement of the vehicle so as to keep a certain relationship between the position of a lane marker of the lane and the position of the vehicle. The driving control apparatus 100 controls the movement of the vehicle so that the vehicle travels along the center of the lane. The lane marker is not limited, provided that it has a function of defining a lane. The lane marker may be a line drawn on a road surface, a planting that exists between lanes, or a road structure that exists on the side of a road shoulder of a lane, such as a guardrail, a curbstone, a sidewalk, and an exclusive road for two wheels. The lane marker may also be a fixed physical object that exists on the side of a road shoulder of a lane, such as an advertising display, a traffic sign, a store, and a roadside tree.

The processor 11, which will be described later, stores an object detected by the detection device 230 so that the detected object is associated with an event and/or a route. The processor 11 stores an object existing within a predetermined distance from an event and having a possibility of encounter in the event so that the object is associated with the event. The processor 11 stores an object encountered in an event so that the object is associated with a route. The processor 11 perceives which route and which position an object exists on. This enables rapid determination of an object which the vehicle encounters in an event. One object may be associated with an event or two or more objects may also be associated with an event. Objects for which a determination is made that the vehicle encounters the objects in an event specified as a place are associated with a common event. For example, when two or more pedestrians are present on a crosswalk defined as an event, each pedestrian is associated with the event of the crosswalk. Each pedestrian may be associated as an independent object or may also be associated as one of a set of objects having a common position and speed (within a predetermined value range).

The onboard apparatus 200 includes the output device 250. The output device 250 includes a display 251 and a speaker 252. The output device 250 outputs various information items regarding the driving control to the user or to occupants of surrounding vehicles. The output device 250 outputs a created driving action plan and information regarding the driving control based on the driving action plan. The output device 250 preliminarily informs the vehicle's occupants that the steering operation and/or acceleration or deceleration will be executed via the display 251 and/or speaker 252, as information in accordance with the control information for the vehicle to travel along the first route (target route). In addition or alternatively, the occupants of the vehicle or the occupants of other vehicles may be preliminarily informed of such information items regarding the driving control via exterior lamps and/or interior lamps. In addition or alternatively, the output device 250 may output various information items regarding the driving control to external devices of the Intelligent Transport Systems or the like via a communication device.

The driving control apparatus 100 will then be described.

The driving control apparatus 100 includes a control device 10, an output device 20, and a communication device 30. The output device 20 serves in the same manner as the previously described output device 250 of the onboard apparatus 200. The display 251 and the speaker 252 may be used as components of the output device 20. The control device 10 and the output device 20 can exchange information with each other via a wired or wireless communication line. The communication device 30 performs information exchange with the onboard apparatus 200, information exchange inside the driving control apparatus 100, and information exchange between external devices and the driving control system 1.

The control device 10 will be described first.

The control device 10 includes the processor 11. The processor 11 is a computing device that performs a driving control process including creation of a driving plan of the vehicle. Specifically, the processor 11 is a computer including a read only memory (ROM) that stores programs for executing the driving control process including creation of a driving plan, a central processing unit (CPU) as an operation circuit that executes the programs stored in the ROM to serve as the control device 10, and a random access memory (RAM) that serves as an accessible storage device.

The processor 11 according to one or more embodiments of the present invention executes the following processes related to a method:

(1) a process of acquiring detection information around the vehicle;

(2) a process of sequentially extracting events which the vehicle encounters, on the basis of the detection information;

(3) a process of determining a driving action on the basis of the detection information acquired in the events;

(4) a process of creating a driving plan in which the driving action is defined for each of the events; and (5) a process of operating the vehicle to execute a driving control instruction in accordance with the driving plan.

The processor 11 further executes (6) a process of determining the detection condition on the basis of the content of the driving action defined for each of the events.

The processor 11 has a first block that realizes a function of creating/re-creating a driving plan, a second block that realizes a function of executing the driving plan, and a third block that realizes a function of setting a detection condition in accordance with the content of a driving action of the driving plan being executed and the change in the content.

The processor 11 executes each of the above functions by cooperation of software for realizing each function or executing each process and the above-described hardware.

First, with reference to FIG. 2A, a driving plan creation process executed by the processor 11 according to one or more embodiments of the present invention will be described. The driving plan creation process is a basic process executed by the driving control system 1. The driving plan creation process includes a process of calculating the first route along which the vehicle travels, a process of extracting events which the vehicle encounters when traveling along the first route, a process of determining driving actions in the events, and a process of creating a driving plan in which the driving action is associated with each event.

The process of calculating the first route will be described first.

The processor 11 calculates a route along which the vehicle is traveling or is planned to travel (this route may also be referred to as a "first route"). To calculate the first route, the processor 11 acquires the subject vehicle information. The processor 11 acquires the current position of the vehicle from the position detection device 221. The processor 11 refers to the map information 222 to calculate the first route using the acquired current position and the traveling direction. In addition or alternatively, the processor 11 may acquire a planned travel route of the vehicle, which is obtained by the navigation device 220, as the first route. In addition or alternatively, the processor 11 may acquire a guidance route from the current position to a destination, which is obtained by the navigation device 220, as the first route. In the process of calculating the route of the vehicle, a scheme known at the time of filing of the present application can be used as appropriate.

The process of extracting events will be described.

The processor 11 acquires (detects/extracts) events which the vehicle traveling along the first route encounters. The events in one or more embodiments of the present invention refer to things (existence of matters/physical objects) that trigger the determination process in the driving control. The driving control to be executed includes acceleration and deceleration of the vehicle and steering of the vehicle. In other words, the events are those which cause the vehicle to accelerate or decelerate and steer. The events may be represented by an intersection on the first route, a stop line on the first route, a crosswalk on the first route, and an object around the vehicle traveling along the first route. The objects include two-dimensional/three-dimensional traffic signs, moving objects such as pedestrians, two-wheel vehicles, and four-wheel vehicles, and road structures such as guardrails, median strips, and curbstones. The processor 11 specifies the positions of events.

The processor 11 refers to the map information 222 to extract another route having a point of intersection with the first route along which the vehicle is traveling or is planned to travel. Examples of such a route having a point of intersection with the first route include a route that intersects with the first route, a route that merges into the first route, a route that is branched from the first route, and other forms of intersections with the first route. When another route is detected, the point of intersection with the other route is an intersection with the first route, which is acquired as an event. The processor 11 refers to the traffic rule information 224 to acquire the existence and positions of traffic signs on the first route. The traffic rule information 224 is information in which information, such as a stop position, entry prohibition, and one-way traffic, is associated with links (routes)

and/or positional information. The processor 11 recognizes the traffic rule of making a stop as an event. The processor 11 extracts a position at which the rule of making a stop is defined, as the position at which the vehicle encounters an event. The extracted position of the event is associated with the route (including a link). Similarly, the processor 11 recognizes the traffic rule of entry prohibition as an event. The processor 11 extracts a further upstream position (upstream side in the traveling direction) than a position at which the rule of entry prohibition is defined, as the position at which the vehicle encounters an event. The extracted position of the event is associated with the route (including a link). The traffic rule information 224 includes the traffic light presented by a traffic signal. The above operation may include referring to the map information 222 and/or the road information 223.

In addition or alternatively, the processor 11 extracts dynamic events which the vehicle traveling along the first route encounters, on the basis of the detection information from the detection device 230. Information on the events detected based on the detection information may include the existence and positions of the objects on the first route. The processor 11 recognizes situations in which objects (physical objects including pedestrians, other vehicles, and road structures, i.e., so-called obstacles) detected by the detection device 230 exist, as events which the vehicle encounters. When the distance between the vehicle and a detected object is less than a predetermined value, the processor 11 may extract the existence of the object as an event. In addition or alternatively, when an estimated time remaining for the vehicle to come into contact with a detected object is less than a predetermined value, the processor 11 may extract the existence of the object as an event.

The processor 11 uses the positional information of objects to extract the events which the vehicle traveling along the first route encounters. The objects include those temporarily regulating the traffic, such as construction sites, disabled vehicles, and regions to avoid. Information on such objects may be included in the road information 223. Information on the positions at which objects exist may be received from information provision apparatuses on the road side, such as those of the ITS.

The processor 11 acquires the existence and positions of objects including obstacles on the first route on the basis of the output results from the detection device 230. The processor 11 refers to the road information 223 to acquire the existence and positions of road structures on the first route. This operation may include referring to the map information 222 and/or the road information 223.

The processor 11 creates a first driving plan for traveling along the first route, on the basis of the relationship between the acquired information on the events (existence and positions) and the vehicle. Creation of the first driving plan may be performed at a predetermined cycle or may also be performed at the timing when the distance between the vehicle and an intersection (event) is less than a predetermined distance.

The processor 11 associates the encounter positions with the extracted plurality of events with the traveling route of the vehicle. The processor 11 arranges/rearranges the extracted plurality of events in the order of encounters with the vehicle. The processor 11 obtains the order of encounters with the events from transition of the position of the vehicle traveling along the first route and the positions of the events and arranges the events in the order of encounters with the vehicle. This information in which the events are arranged in the temporal sequence of encounters may be presented to the user via the output device 20, which will be described later.

Subsequently, the processor 11 plans a driving action of the vehicle traveling along the route. The processor 11 creates a driving plan when the vehicle travels along the first route, using the relationship (evaluation result) between the vehicle and the plurality of events which the vehicle encounters in time series when traveling along the first route. The processor 11 takes into account the existence of the objects, which are detected by the detection device 230, to create the driving plan.

The processor 11 arranges the plurality of events in the order of encounters with the vehicle and creates a control instruction in accordance with a sequential driving plan in which the driving action is defined for each event. In such a scheme using a one-dimensional situation map (ODSM), the driving action in an upstream or downstream event affects the driving action in a downstream or upstream event. For example, in a sequential driving plan determined once, if any driving action is changed due to the appearance of a new object (another vehicle), other driving actions are also affected. The change of the driving action in an event changes the time for the vehicle to arrive at the event and therefore affects the timing of arrival at each of the events arranged in time series. If the timing of arrival at an event changes, the movement amount of an object also changes, so the situation in each event also changes. For example, when the driving action in the upstream event is making a stop, the vehicle is decelerated regardless of the driving action in the downstream event. Furthermore, when the driving action in the downstream event is making a stop, the vehicle is required at least to decelerate even if the driving action in the upstream event is going. When the vehicle speed becomes low, increase in the time to arrival at the event due to the deceleration causes a change in the situation in the event to be encountered, so the driving action on the upstream side is also affected. The driving plan having such technical features involves a unique problem that it is required to cope with the content of each of the driving actions arranged in time series and the chance in the content. To overcome this problem, in one or more embodiments of the present invention, optimization of the detection condition is executed in accordance with the content of each of the driving actions arranged in time series.

The processor 11 evaluates the type of each extracted event (an intersection, a traffic rule, or an object), the positional relationship with the event and the change in the position (a distance, a time to contact, an approach speed, or a distance after a predetermined time), the content of the event (content of a traffic rule or an attribute of an object), etc. The processor 11 obtains the distance to the event and the change in the distance using the vehicle speed of the vehicle acquired from the vehicle speed sensor 262.

When the event is a traffic rule, the processor 11 refers to one or more of the traffic rule information 224, the map information 222, the road information 223, and the detection result from the detection device 230 to read the type of the traffic rule, the position/change in the position, and the content. When the event is a traffic signal, the processor 11 recognizes whether the traffic rule indicated by the traffic signal is any of Go/Caution/Stop on the basis of the recognition result of the signal recognition function of the detection device 230. The processor 11 may also recognize the traffic rule indicated by the traffic signal on the basis of the signal information which is transmitted by the external ITS and acquired via the communication device 30. When the event is a traffic sign such as a stop line, a temporary stop line, a stop prohibition area, or lane change prohibition, the processor 11 refers to the traffic rule information 224, the road information 223, and the map information 222 to recognize the position and content of the traffic sign which are detected by the detection device 230.

When the event is an object such as a pedestrian, another vehicle, or a road structure, the processor 11 obtains the type of the vehicle or object, the position/change in the position, and the content on the basis of the position and moving speed of the object which are detected by the detection device 230.

The processor 11 determines a driving action for each of the extracted plurality of events. The actions to be determined include an action of going (Go) and an action of stopping (Stop: No Go). The processor 11 determines either the action of going or the action of stopping for each event. When the event is a traffic rule and the traffic rule requires stopping, the processor 11 determines that the driving action for the event is "Stop." On the other hand, when the traffic rule permits passage, the processor 11 determines that the driving action for the event is "Go." When the event is an object and the distance to the object is less than a predetermined value, the change in distance is not less than a predetermined value, or the time to contact is less than a predetermined value, the processor 11 determines that the driving action for the event is "Stop." On the other hand, when the distance to the object is not less than the predetermined value, the change in distance is less than the predetermined value, or the time to contact is not less than the predetermined value, the processor 11 determines that the driving action for the event is "Go." The processor 11 creates the sequential driving plan on the basis of the contents of respective actions determined for the plurality of events.

Figure 2A:
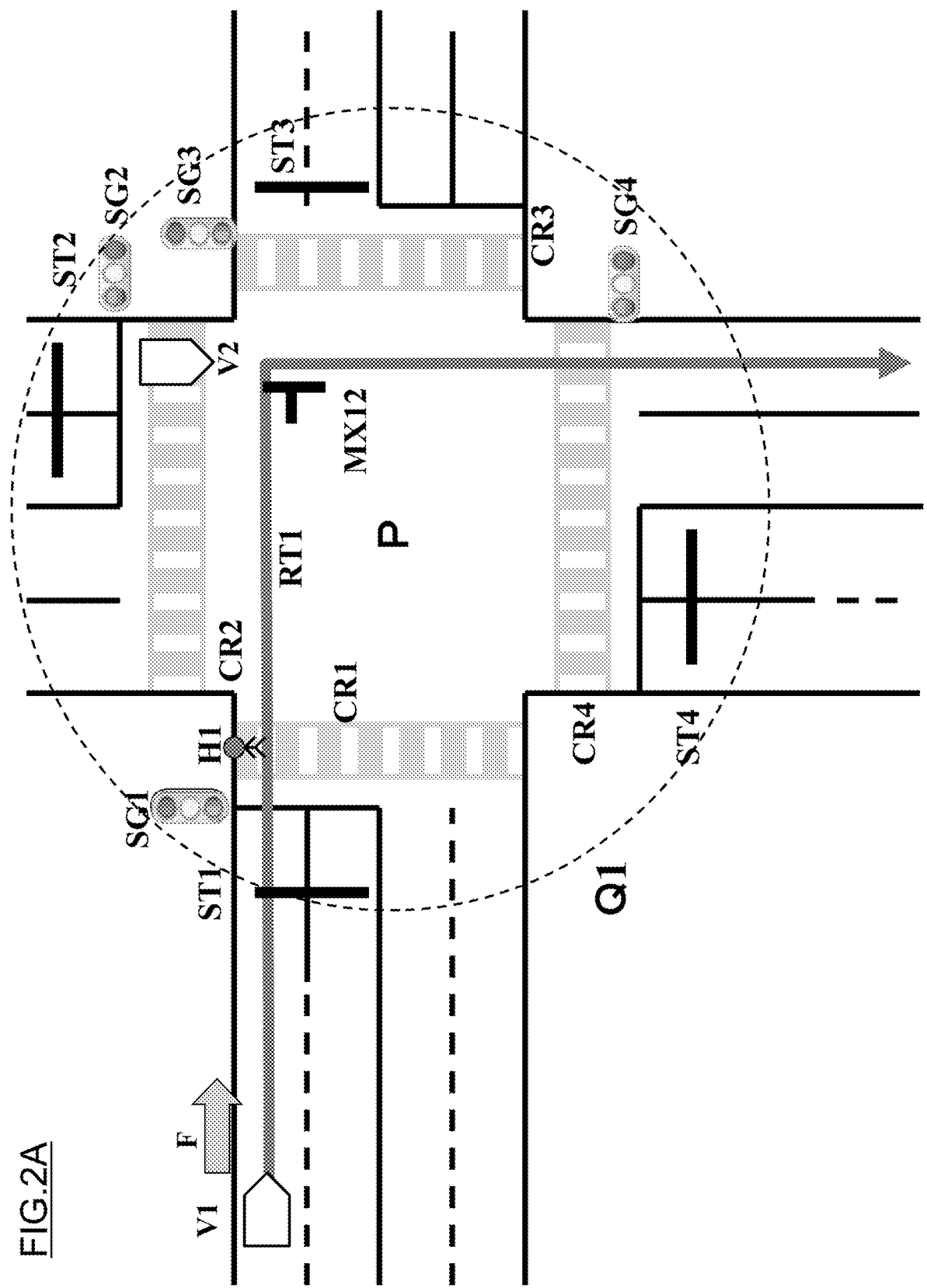
FIG. 2A is a diagram for describing an example of a driving plan.

With reference to FIG. 2A, an example of a scheme of creating the driving plan will be described. This scheme is executed by the processor 11 and includes determining the driving actions. The processor 11 determines a driving action to be taken for an event (stop lines ST1, ST2, ST3, ST4; traffic signals SG1, SG2, SG3, SG4; and crosswalks CR1, CR2, CR3, CR4) which a vehicle V1 encounters when traveling along a first route RT1. The processor 11 takes into account the destination of the vehicle V1 to calculate a route along which the vehicle travels. The calculated route is the first route RT1 in one or more embodiments of the present invention. Using the first route RT1 illustrated in FIG. 2A as an example, creation of the driving plan when traveling along the first route RT1 will be described. On the first route RT1, the vehicle V1 travels in the direction indicated by an arrow F, passes through a stop line ST1, a traffic signal SG1, and a crosswalk CR1, and turns right in an intersection P. Events which the vehicle V1 encounters when traveling along the first route RT1 are the stop line ST1, the traffic signal SG1, the crosswalk CR1, another vehicle V2 coming close to the vehicle V1 when the vehicle V1 enters the right-turn lane, and the crosswalk CR4. The processor 11 extracts an event at one detection timing. The event which the vehicle V1 encounters changes from moment to moment, so if the timing is different, the position and movement (such as a speed) of the object also change. The processor 11 calculates a momentary driving plan at a predetermined cycle as the event changes from moment to moment. The processor 11 may calculate the driving plan when the vehicle V1 enters an area of a predetermined distance or less from an intersection (point of intersection with another route) on the first route.

The processor 11 determines the type of each extracted event (an intersection, a traffic rule, or an object), the positional relationship with the event and the change in the position (a distance, a time to contact, an approach speed, or a distance after a predetermined time), and the content of the event (content of a traffic rule or an attribute of an object).

The processor 11 recognizes an event (stop line ST1) that is closest to the vehicle V1. The processor 11 determines that the stop line ST1 is a traffic rule, the distance from the vehicle V1 is D1, the time to arrival is S1, and the stop line ST1 is an event that requires a temporary stop.

The processor 11 recognizes an event (traffic signal SG1) that is second closest to the vehicle V1 and corresponds to the stop line ST1. The processor 11 determines that the traffic signal SG1 is a traffic rule, the distance from the vehicle V1 is D2, the time to arrival is S2, and the traffic signal SG1 is an event that prohibits going (red/yellow signal light). The stop line ST1 is an event that indicates a position at which the vehicle V1 is stopped on the upstream side of the traffic signal SG1 when the vehicle V1 is about to enter the intersection and the traffic signal SG1 instructs to make a stop. The traffic signal SG1 and the stop line ST1 are recognized as separate events, but are associated with each other in the traffic rule information 224. The content of the stop line ST1 is "Stop" when the traffic signal SG1 presents the signal light (red/yellow signal light) which instructs to make a stop, but is "Go" when the traffic signal SG1 presents the signal light (blue/green) which instructs to go. On the basis of the fact that the event (traffic signal SG1) indicates prohibition of going, the processor 11 determines that the driving action for the event (stop line ST1) associated with the event (traffic signal SG1) is "Stop." The stop line ST1 and the traffic signal SG1 can be regarded as a common event in the driving control of this example.

The processor 11 recognizes an event (crosswalk CR1) that is third closest to the vehicle V1. The processor 11 determines that the crosswalk CR1 is a traffic rule, the distance from the vehicle V1 is D2, the time to arrival is S2, and the crosswalk CR1 is an event that permits going (blue/green signal light). The traffic rule of a crosswalk is "Stop" when the signal light indicates prohibition of entering and "Go" when the signal light indicates permission of entering. From another aspect, the traffic rule of a crosswalk is "Stop" when a pedestrian is present at the crosswalk and "Go" when no pedestrians are present at the crosswalk. The processor 11 determines that the driving action for the event (crosswalk CR1) is "Stop" because the event (traffic signal SG1) indicates prohibition of going. There is also a pedestrian H1 who is walking on the crosswalk CR1. The detection device 230 detects the pedestrian H1. On the basis of the detection result of the detection device 230 (presence of the pedestrian H1), the processor 11 determines that the driving action for the event (crosswalk CR1) is "Stop."

When turning right in the intersection P, the processor 11 extracts a point (intersection) at which the first route intersects with another road as an event. The processor recognizes an event (intersection MX12) that is fourth closest to the vehicle V1. The processor determines that the intersection MX12 is an intersection, the distance from the vehicle V1 is D3, and the time to arrival is S3. In addition, another vehicle V2 approaching the intersection MX12 is present. The detection device 230 detects the other vehicle V2 approaching the intersection MX12. The detection device 230 recognizes a physical object to which the time to collision (TTC) for the vehicle V1 is within a predetermined time as an object. On the basis of the detection result of the detection device 230 (presence of the other vehicle V2), the processor 11 determines that the driving action for the event (intersection MX12) is "Stop."

The processor 11 extracts a crosswalk CR4 which the vehicle enters after the right turn in the intersection P as an event. The processor 11 recognizes an event (crosswalk CR4) that is fifth closest to the vehicle V1. The processor 11 determines that the crosswalk CR4 is a traffic rule, the distance from the vehicle V1 is D4, and the time to arrival is S4. When exiting an intersection area, no stop is required before entering a crosswalk. However, it is still necessary to give care to the presence of objects around. As will be understood, when passing through the crosswalk CR4, the processor 11 monitors the detection result of the detection device 230 to confirm that there are no objects around. Provided that the detection device 230 detects no objects at the timing before entering the event (crosswalk CR4), the processor 11 determines that the driving action for the event (crosswalk CR4) is "Go."

On the basis of the relationships between the vehicle V1 and a plurality of events which the vehicle V1 encounters in time series, the processor 11 determines either the action of going or the action of stopping for each event and creates a sequential driving plan using the content of the action determined for each event. The processor 11 creates the sequential driving plan regarding the events using the relationships between the vehicle V1 and the plurality of events which the vehicle V1 encounters when traveling along the first route. This can simplify the process up to the creation of a final driving plan. The calculation load can be reduced while creating a highly accurate driving plan with consideration for necessary events.

As described above, the relationship between an event and the vehicle V1 changes from moment to moment as the state of the event changes. Change in the state of an event causes the driving action to also change. The processor 11 creates the driving plan of the vehicle V1 traveling along the first route in a sequential manner (at a predetermined cycle) using the relationship between each event and the vehicle V1.

The driving control apparatus 100 presents the created driving plan to the user. The output device 20 displays the events which are extracted by the processor 11 and arranged in the order of encounters. The output device 20 uses the display 251 to display information regarding the driving plan. The output device 20 may output a plurality of arranged events by voice or sound using the speaker 252.

Figure 2B:
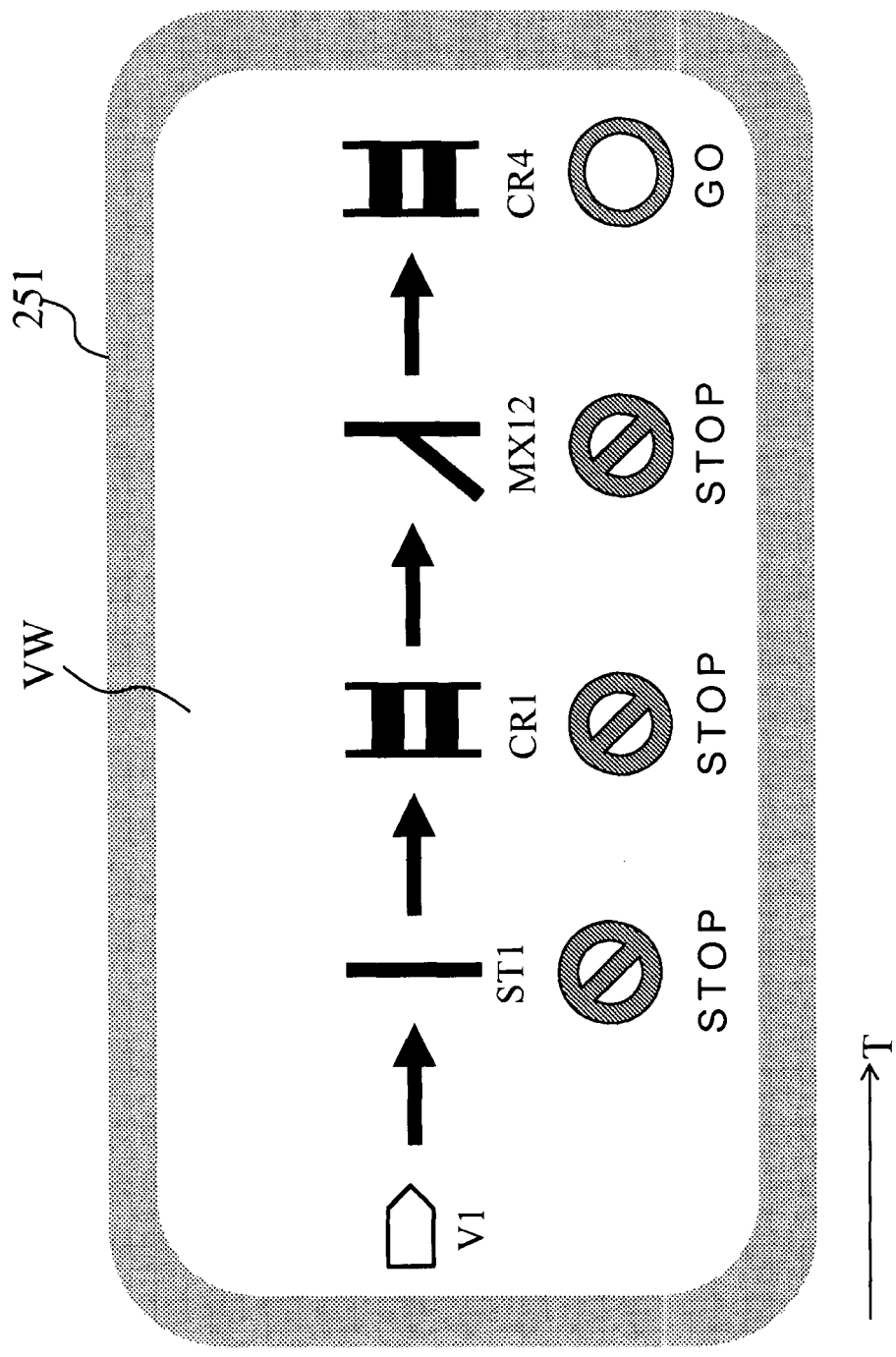
FIG. 2B is a diagram illustrating a display example of the driving plan.

FIG. 2B is a display example illustrating the events in time series. An arrow T indicates the traveling direction of the vehicle V1 along the first route. The output device 20 displays the extracted events: the stop line ST1 and the traffic signal SG1; the crosswalk CR1; the intersection MX12; and the crosswalk CR4 along the arrow T as the time axis in the order of encounters with the vehicle V 1. The information indicating the events may be symbols, text information, or abstract marks. The coloring, size, etc. can be determined arbitrarily.

The output device 20 displays the driving action determined by the processor 11 for each event in association with the event. In information VW illustrated in FIG. 2B, the driving action in each event is displayed beneath the event so that the position along the arrow T is common to the event. The information indicating the driving actions may be symbols, text information, or abstract marks. The coloring, size, etc. can be determined arbitrarily.

Even when the events include stationary objects, such as points of intersections between routes, stop lines defined in traffic rules, and road structures, as well as moving objects, such as pedestrians and other vehicles, the output device 20 arranges the stationary objects and moving objects included in the extracted plurality of events in the order of encounters with the vehicle V1, that is, along the common time axis. Other vehicles include those coming close to the vehicle from behind.

Thus, the events which the vehicle V1 traveling along the first route encounters are arranged and displayed in the order of encounters with the vehicle V1, and the driver of the vehicle V1 can thereby visually recognize what kinds of events the vehicle V1 encounters in what order and what kinds of driving actions are taken.

A procedure of the process executed in the driving control system 1 according to one or more embodiments of the present invention will then be described with reference to the flowchart of FIG. 3. The overview of processing in each step is as described above. Flow of the process will be mainly described herein.

First, in step S1, the processor 11 acquires vehicle information of the vehicle to be controlled. The vehicle information includes information regarding the driving of the vehicle, such as the current position, traveling direction, speed, acceleration, braking amount, steering amount, steering speed, and steering acceleration, spec information of the vehicle, and performance information of the vehicle. The vehicle information is acquired from the onboard apparatus 200.

In step S2, the processor 11 acquires detection information. The detection information includes the presence or absence of events and the positions of the events. The positions of events refer to positions of things, such as intersections and objects, which trigger the determination process in the driving control. The detection information includes the presence or absence of a physical object around the vehicle, the attribute of the object (stationary object or moving object), the position of the object, the speed/acceleration of the object, and the traveling direction of the object. The detection information can be acquired from the onboard apparatus 200 which includes the detection device 230 and the navigation device 220.

In step S3, the processor 11 determines whether the nearest scene which the vehicle V1 is to encounter is changed. The scene is a scene, such as an intersection which the vehicle is to pass through. For example, when an intersection which the vehicle is to pass through is the scene, the scene includes events of entering the intersection, intersecting with another route, and exiting the intersection. The scene includes a plurality of events. The scene to be encountered can also be defined as a unit to which a set of control instructions corresponding to the events is applied. The processor 11 determines that the travel route is not changed and whether or not the vehicle has passed through the scene which is a target of the driving control. This is because the necessity of setting a new (next) scene should be determined. When the current position of the vehicle belongs to a route that has already been calculated, the processor 11 determines that the travel route is not changed. When the current position of the vehicle does not belong to the route which has already been calculated, the processor 11 determines that the travel route is changed. When the current position of the vehicle does not belong to a region that has been set as a scene to be passed immediately before, the processor 11 determines that the vehicle has passed through the scene. When the current position of the vehicle V1 belongs to the region which has been set as the scene to be passed immediately before, the processor 11 determines that the vehicle has not yet passed through the scene. When the vehicle has passed through the scene, creation and execution of the driving plan for the next scene or event are repeated.

When, in step S3, the travel route is changed or when the vehicle has passed through the scene, the processor 11 determines that the scene is changed, and executes the processes of steps S4 to S9. When the travel route is changed or when the vehicle has passed through the scene, the processor 11 determines that the scene is changed, and executes the processes of steps S4 to S9. When the travel route is not changed and the vehicle has not yet passed through the scene, the processor 11 determines that the scene is not changed and the process proceeds to step S11.

In step S4, the processor 11 calculates a first route along which the vehicle V1 travels. The first route calculated by the navigation device 220 may also be used. The first route is specified by a road identifier, a lane identifier, a node identifier, and/or a link identifier. These road identifier, lane identifier, node identifier, and link identifier are defined in the map information 222 and/or the road information 223.

In step S5, the processor 11 sets a scene which the vehicle V1 traveling along the first route encounters. The scene is a region that includes points at which points of intersections between the first route and other routes exist. The form of a point of intersection with the first route is not limited and may be any of a merging point, a branching point, an intersection, a T-intersection, and an adjacent point. The scene is a region that includes points at which stopping is required on the first route in accordance with the traffic rule information 224. The processor 11 refers to the map information 222, road information 223, and/or traffic rule information 224 to set a region R1 that is a scene in which the vehicle V1 is highly likely to encounter events (see FIG. 2). Examples of scenes which the vehicle V1 encounters include a region in the vicinity of an intersection, a region in the vicinity of a merging point of lanes, a region in the vicinity of a crosswalk, a region in the vicinity of a stop line, a region in the vicinity of a railroad crossing, and a region in the vicinity of a construction site.

In step S6, the processor 11 extracts one or more second routes having points of intersections with the first route. The processor 11 refers to the map information 222 and/or the road information 223 to extract the second routes having points of intersections with the first route. The processor 11 refers to link information (node information) defined in the map information 222. At a location at which two or more routes intersect with each other, the link information (node information) is connected to two or more other links. The processor 11 extracts the second routes which intersect with the first route, from the connection situation of the link information (node information).

In step S7, the processor 11 extracts events which the vehicle V1 encounters in the set scene. The processor 11 extracts points of intersections between the first route and the second routes as events. As will be understood, at a merging point of routes, two or more links are connected to another link. At an intersection, the vicinity of entrance to the intersection corresponds to a branching point of lanes while the vicinity of exit from the intersection corresponds to a merging point of lanes. Thus, a point at which one link is connected to two or more other links can be extracted as an event in which the first route and one or more second routes intersect with each other on the exit side of an intersection. In other words, one or more second routes can be detected at the exit from an intersection by detecting the existence of a point at which one link is connected to two or more other links. In addition, the link information is defined also for a crosswalk, and a crosswalk intersecting with the first route can be detected as a second route by determining the intersection between a link of the first route and a link of the crosswalk. The processor 11 extracts things at which a temporary stop is required on the first route in accordance with the traffic rule information 224, as events.

Positions of the extracted events are stored in association with the routes. Positions of the extracted events may also be stored in association with the map information 222 and/or the road information 223. In the creation of a driving plan which will be performed afterward, the driving action is determined for each extracted event (the position of each event).

In step S8, the processor 11 determines the driving action for each event. Driving actions include "Stop/No-Go" and "Go." When the event is a location at which going is prohibited (a temporary stop line or a stop signal) or the like, the driving action in the event is "Stop." In addition or alternatively, when the possibility of contact with an object is high in an event, the driving action in the event is also "Stop." On the other hand, when the event is a location at which going is permitted ("Go" signal) or the like, the driving action in the event is "Go." In addition or alternatively, when the possibility of contact with an object is low in an event, the driving action in the event is also "Go." The possibility of contact is determined on the basis of the time difference between the time when the vehicle arrives at the event and the time when the object arrives at the event.

In step S9, the processor 11 arranges the extracted plurality of events in the order of encounters with the vehicle V1. The output device 20 displays the arranged events on the display 251 (see FIG. 2B). The output device 20 may output the arranged events by voice or sound using the speaker 252. This display may be performed after the driving plan is created.

In step S11, the processor 11 verifies the newly acquired detection information. The situation around the traveling vehicle changes from moment to moment. Situations around are not fixed, such as caused by movement of the vehicle itself, change in the positional relationships with other vehicles, change in the positions of pedestrians, appearance of new objects, and change in the detection accuracy due to change of positions. That is, the existence and the presence or absence of events, which are extracted on the basis of the detection information acquired in step S2, have to be reviewed sequentially. The detection information verified in step S11 is detection information acquired at later timing than the detection information acquired in step S2. The processor 11 extracts objects which the vehicle traveling along the first route encounters, on the basis of the new detection information. The processor 11 extracts information on objects existing on one or more second routes that intersect with the first route. This information may be included in the object information obtained in step S2.

In step 12, the processor 11 associates the newly detected objects with one or more events. A crosswalk as an event and a pedestrian as an object may be associated with each other. When a point of intersection with a second route is an event, the event may be associated with another vehicle traveling along the second route. Objects existing on the first route may be defined as events.

In step S13, the processor 11 takes into account the newly detected events to determine the driving action in each event. As described above, the driving action is determined on the basis of the traffic rule in the event and the possibility of contact between the vehicle and an object. The possibility of contact is determined on the basis of the distance between the vehicle and the object or the time remaining for the vehicle to come into contact with the object. The time for both to contact is calculated using the speeds of the vehicle and the object. The possibility of contact is calculated on the basis of the time for the vehicle and the object to arrive at the event. The driving action in an event is determined on the basis of the possibility of contact in the event.

The processing from step S11 to step S13 is preferably performed at a predetermined cycle. Depending on the condition, it is not impossible to skip from step S8 to step S14.

When the timing at which the vehicle arrives at an event and the timing at which an object arrives at the event are separated by a predetermined time or more, the possibility of contact is low, so the driving action of "Go" is defined for the event. On the other hand, when the timing at which the vehicle arrives at an event and the timing at which an object arrives at the event are separated by less than the predetermined time, the possibility of contact is high, so the driving action of "Stop" is defined for the event. Similarly, regarding the distance, when the distance between the vehicle and an object which are to arrive at an event is a predetermined distance or more, the possibility of contact is low, so the driving action of "Go" is defined for the event. On the other hand, when the distance between the vehicle and the object which are to arrive at the event is less than the predetermined distance, the possibility of contact is high, so the driving action of "Stop" is defined for the event. When the event is an object, the possibility of contact is determined on the basis of the positional relationship between the vehicle and the object.

The processor 11 determines the movement of an object on the basis of the detection information or a change over time of the detection information. In this determination, the processor 11 estimates the positional relationship between the object and the vehicle or the event on the assumption of the moving direction and speed of the object. The degree of freedom (variance value) in the moving direction of the object varies depending on the attribute of the object, such as a vehicle, a two-wheel vehicle, or a pedestrian moving on the road. The processor 11 estimates the moving direction of the object on the basis of the attribute of the object analyzed from the captured image or the like and calculates the probability that the estimated moving direction coincides with the direction in which the vehicle exists. By narrowing down the moving directions of the object and changing the threshold for the degree of coincidence between the moving direction and the direction in which the vehicle exists, the level of the probability value that the estimated moving direction coincides with the direction in which the vehicle exists can be controlled.

The range (variance value) of the estimated speed of an object differs depending on the attribute of the object, such as a vehicle, a two-wheel vehicle, or a pedestrian moving on the road. The processor 11 calculates a time for the object to arrive at the event in accordance with the range of the estimated speed of the object and compares that time with the time for the vehicle to arrive at the event, which is calculated on the basis of the vehicle information, to calculate the probability that the time difference between when the vehicle arrives at the event and when the object arrives at the event is within a predetermined time. By narrowing down the range of the estimated speed of the object and changing the threshold for evaluating the time difference, the level of the probability value that the vehicle and the object arrive at the event substantially at the same time can be controlled.

The processor 11 estimates the traveling direction and speed of an object on the basis of the attribute of the object analyzed from the captured image or the like and calculates the probability of contact with the vehicle moving at an estimated speed. The probability of contact with the vehicle is calculated by multiplying the behavior of the object (traveling direction, speed, etc.) by a coefficient. When the probability is not less than a predetermined probability as a threshold, the processor 11 treats the object as an object of interest that may come into contact with the vehicle, while when the probability is less than the predetermined probability, the processor 11 treats the object as an object that does not come into contact with the vehicle. The processor 11 changes the detection condition by adjusting the probability that the object moves toward the vehicle, the range (variance value) of the estimated speed of the object, and the threshold for evaluating the object. By increasing the probability that the object moves toward the vehicle, increasing the range of the estimated speed of the object, or changing the threshold for evaluating the object to a low value, the detection condition can be set with a high probability that a determination is made that the object comes into contact with the vehicle.

On the basis of the behavior of an object around the vehicle, the processor 11 calculates the probability that the object comes into contact with the vehicle. When the probability that the object comes into contact with the vehicle is higher than a predetermined threshold, the processor 11 determines the "threshold" of the probability as the detection condition in order to recognize the object as an object of interest.

On the basis of the behavior of an object around the vehicle, the processor 11 calculates the probability that the object comes into contact with the vehicle. When the probability that the object comes into contact with the vehicle is higher than a predetermined threshold, the processor 11 determines, as the detection condition, a method of calculating the probability that the object is recognized as an object of interest.

The processor 11 according to one or more embodiments of the present invention sets the probability that an object and the vehicle come into contact with each other and the threshold for the probability in accordance with the content of the driving action in an event. The processor 11 adjusts (corrects) the moving direction and moving speed of the object, which are determined on the basis of the change over time of the detection information, the attribute of the object, and the like, in accordance with the content of the driving action. Specific schemes will be described later.

In step S14, the processor 11 creates a driving plan in which the driving action is defined for each event. The processor 11 creates the driving plan in which the driving action is associated with each of a plurality of events that belong to the region Q1 set as a scene. The driving plan of this example is a set of instructions for arranging the extracted plurality of events in the order of encounters with the vehicle and defining the driving action for each event. The unit of the driving plan is not particularly limited. In this example, the scene of encounter with an intersection is the target of the driving plan, but a driving plan up to the destination may be provisionally created, or a driving plan may be created in terms of a predetermined number of events.

Figure 4:
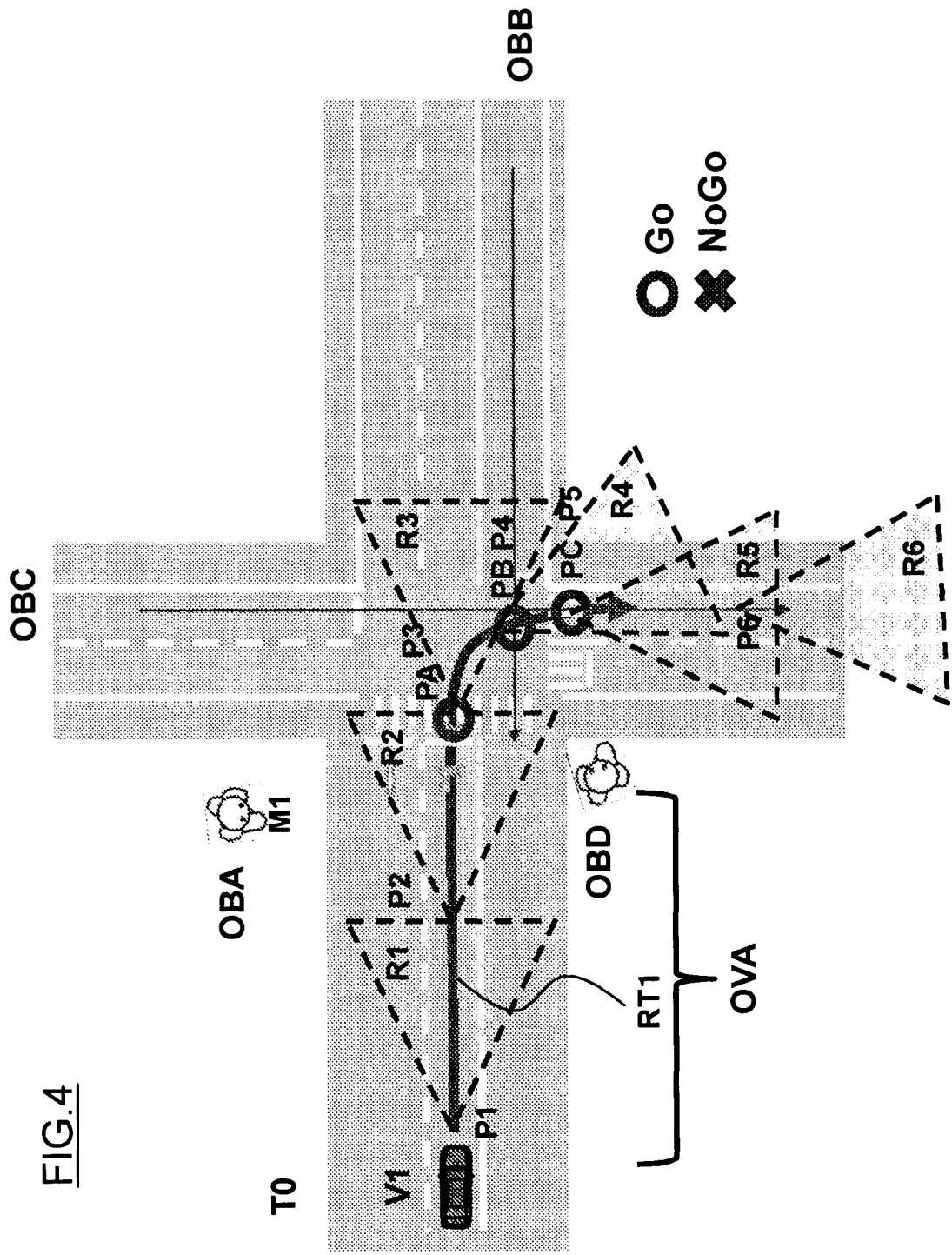
FIG. 4 is a diagram for describing a method of setting a detection condition.

In step S15, the processor 11 sets a detection condition on the basis of the content of the driving action in an event. The processor 11 operates the onboard apparatus to execute the detection process in accordance with the determined detection condition. The detection condition in one or more embodiments of the present invention can be set for each point. The detection condition can be set for each event for which the point is specified because the detection condition can be set for each point. FIG. 4 is a conceptual diagram for describing a situation in which the detection condition is set for each point. As illustrated in FIG. 4, detection conditions R1 to R6 can be respectively set for points P1 to P6 that are set on the first route RT1 along which the vehicle V1 to be controlled travels. The detection conditions R1 to R6 may be a common condition or may also be different conditions. That is, a wide detection range can be set at a point while a narrow detection range can be set at another point. Setting instructions including detection conditions can include a detection range (distance along the traveling direction, distance along the vehicle width direction, height, scan range, imaging angle of view, focal distance, etc.), an applicable event (applicable position), or applicable timing (passing point or time).

On the basis of the content of the driving action in an event, the processor 11 sets the detection condition in the event. The processor 11 may define a section OVA in which the detection condition for an event PA is applied, and may apply the same detection condition at a position that belongs to the section OVA. The section OVA in which the detection condition is applied can be defined as a section from a first point of a first predetermined distance on the upstream side (vehicle side) of the event to a second point of a second distance. The first point may be set as the position of an event. On the basis of the driving action determined for the event PA, the processor 11 sets the detection condition at each point that belongs to the section OVA on the upstream side of the event PA.

The processor 11 determines the detection condition on the basis of the driving action in a second event which the vehicle encounters next to a first event which the vehicle encounters earlier. The processor 11 operates the onboard apparatus 200 to execute the detection process in accordance with the determined detection condition. When the vehicle encounters a plurality of events PA, PB, and PC in this order, the detection condition is obtained on the basis of the content of the driving action in the second event PB which the vehicle encounters next to the first event PA which the vehicle encounters earlier (i.e., the vehicle encounters the second event PB second), and the onboard apparatus 200 is operated to set the new detection condition. This allows the processor 11 to set the detection condition in the upstream first event PA of the second event PB on the basis of the content of the driving action in the second event PB which the vehicle encounters second.

The processor 11 arranges a plurality of events in the order of encounters with the vehicle and creates control instructions in accordance with a sequential driving plan in which the driving action is defined for each event. As previously described, in a scheme using such a one-dimensional map, the driving action in the upstream or downstream event affects the driving action in the downstream or upstream event. For example, provided that the driving action in the downstream event is stopping, even when the driving action in the upstream event is going, increase in the time to arrival due to deceleration causes a change in the situation. When the driving action in the upstream event is stopping, the vehicle is decelerated regardless of the driving action on the downstream side, so the arrival time at the event is delayed. At this time, the vehicle is traveling at a low speed. The processor 11 foresees the driving action (recognizes driving action in advance) in the relatively downstream event (in the traveling direction) to set the detection condition in the most recent event. Thus, the detection condition in an event is set with estimation of the change in the driving action in the next event and it is therefore possible to set an appropriate detection condition based on the driving action in the next event. From the viewpoint that the event which the vehicle encounters second affects the sequential driving plan, the second driving action is taken into account to obtain an appropriate detection condition to be applied. The success rate (completion rate) of the driving plan can be increased because the driving action and the driving plan can be created using the detection information which follows such a detection condition.

In this process, the processor 11 determines the detection condition on the basis of the driving action in the second event which the vehicle encounters next to the first event which the vehicle encounters earlier. After the vehicle passes through the first event, the processor 11 switches to the determined detection condition and operates the onboard apparatus 200 to execute the detection process in accordance with the switched detection condition. When the vehicle encounters a plurality of events PA, PB, and PC in this order, the detection condition is obtained on the basis of the content of the driving action in the second event PB which the vehicle encounters next to the first event PA which the vehicle encounters earlier (i.e., the vehicle encounters the second event PB second), and the onboard apparatus 200 is operated to set the new detection condition after the vehicle passes through the first event. This allows the processor 11 to set the detection condition in the second event PB on the basis of the content of the driving action in the second event PB which the vehicle encounters second.

The processor 11 can foresee the driving action in the relatively downstream second event (in the traveling direction), set the detection condition early, and execute the detection process in which the new detection condition is applied, immediately after the vehicle passes through the first event. The detection condition suitable for the driving action in the next event can thus be set at appropriate timing. The success rate (completion rate) of the driving plan can be increased because the driving action and driving plan suitable for the situation can be created using the detection information which follows such an appropriate detection condition.

Detection condition factors will be described.

The detection condition factors include (1) a detection range, (2) a method of calculating the contact probability with an object, and (3) a method of narrowing down of objects to be extracted. The processor 11 specifies a detection condition factor and changes the detection condition factor in the detection device 230. Each factor will be described.

(1) The "detection range" includes the size (area), length (length along the traveling direction), width (length along the vehicle width direction), and height (length in a direction substantially perpendicular to the surface for traveling) of the detection region, and the scan range (angle), angle of view, or focal distance in the detection region. These are designated in the detection condition.

(2) The "method of calculating the contact probability with an object" refers to setting conditions for the moving direction of an object, the speed of the object, and the moving range of the object when determining the existence of objects that come into contact with the vehicle. These are designated in the detection condition. As previously described, the moving direction of an object, the speed of the object, and the moving range of the object differ depending on the attribute of the object. A pedestrian having a high degree of freedom in the moving direction has a different conclusion as to whether or not the pedestrian is regarded as an object, depending on a determination whether the pedestrian moves toward the vehicle or moves away from the vehicle. The processor 11 calculates the probability of contact between the object and the vehicle using the moving direction of the object, the speed of the object, and the moving range of the object, which are defined values set on the basis of predetermined likelihoods, and respective coefficients. When the driving action in an event is going, the coefficient is set lower than in the case of stopping, while when the driving action in an event is stopping, the coefficient is set higher than in the case of going. The processor 11 according to one or more embodiments of the present invention changes the moving direction of the object, the speed of the object, and the moving range of the object, which are defined values, so that the probability that the object comes into contact with the vehicle is increased or decreased. In addition or alternatively, when the driving action in an event is going, the coefficient is set higher than in the case of stopping, while when the driving action in an event is stopping, the coefficient is set lower than in the case of going. This enables adjustment as to whether or not to regard the object coming into contact with the vehicle as an object of interest.

(3) The processing of "narrowing down of objects to be extracted" refers to a detection condition for extracting only oncoming vehicles and crossing vehicles that are likely to come into contact with the vehicle from among all the objects included in the detection information. For example, objects that have already passed through an event before the vehicle arrives at the event are not extracted as objects.

A scheme of determining the detection condition will then be described. The detection condition is determined on the basis of the content of the driving action defined for an event.

Figure 3:
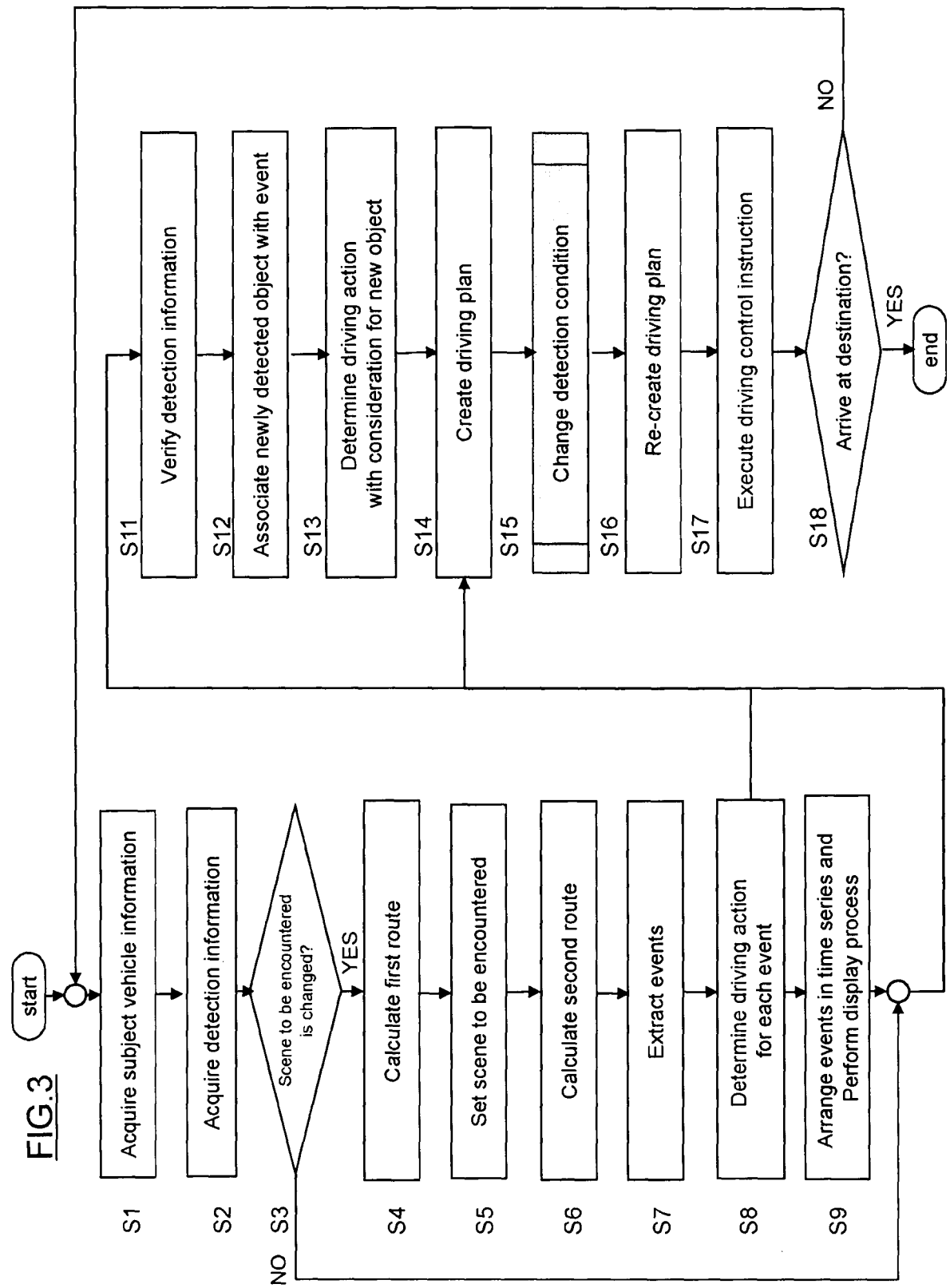
FIG. 3 is a flowchart illustrating a control procedure executed by the driving control system according to one or more embodiments of the present invention.

FIG. 5 illustrates a subroutine associated with step S15 (change of detection condition) of FIG. 3.

First, in step S21, the necessity of a process of changing the detection condition is checked. The processor 11 determines whether or not to switch the detection condition, on the basis of the change amount of movement of the object obtained from the change over time of the detection information. When the change amount of movement of the object is not less than a predetermined value, the processor 11 executes the process of changing the detection condition in step S15. Otherwise the processor 11 does not execute the process of changing the detection condition. When the movement of the object does not change, a determination is made that changing the detection condition is not necessary. For example, in a situation (location or time) in which there are almost no pedestrians or other vehicles or the movement is constant, the process of re-setting the detection condition is not performed. On the other hand, when the driving action is changed, such as in a case in which a pedestrian near a crosswalk suddenly starts running, the detection condition is also reviewed.

When the change amount of movement of the object is less than the predetermined value, the possibility that the determination of the driving action is changed is low. When the determination of the driving action is not changed, the setting of the detection condition is likely to be maintained. This enables an appropriate determination of changing/maintaining the detection condition and it is thus possible to execute the driving control suitable for the actual situation. This can suppress the uncomfortable feeling given to the occupants due to frequent changes of the detection condition.

In step 22, the processor 11 determines whether or not the driving action is "Go." Determination of "Go" is followed by step S23.

In step S23, the processor 11 sets the following first detection condition in accordance with the driving action of "Go."

(1) A detection condition with which an object having a relatively short time to arrival at a target event can be detected.

(2) A detection condition in which the detection range for detecting an object is relatively narrow.

(3) A detection condition in which the probability of a determination that an object comes into contact with the vehicle is set relatively low (determined relatively low).

When a determination is made in step 22 that the driving action is not "Go," the driving action is "Stop" (step S24), and the process proceeds to step S25.

In step S25, the processor 11 sets the following second detection condition in accordance with the driving action of "Stop."

(1) A detection condition with which an object having a relatively long time to arrival at a target event can be detected.

(2) A detection condition in which the detection range for detecting an object is relatively wide.

(3) A detection condition in which the probability of a determination that an object comes into contact with the vehicle is set relatively high (determined relatively high).

When the setting of the detection condition is completed, the process proceeds to step S16. The processor 11 creates a driving plan again. In step S16, on the basis of the detection information acquired in accordance with the changed detection condition, the processes of steps S11 to S13 are performed to re-create a new driving plan. Verification of the detection information performed in step S16, that is, extraction of a new object, association with an event, and determination of the driving action for the event, may be the same as those of steps S4 to S8 performed previously or those of steps S11 to S13 performed last time or may also be different processes.

An appropriate detection condition can be set by determining the detection condition on the basis of the content of a driving action. During the execution of the driving control, movement of the vehicle to be controlled changes and the situation around also changes. By setting the detection condition in accordance with the driving action, it is possible to accurately perceive objects to be detected during the driving control and the situation change of the objects. Under the new detection condition, objects can be detected in accordance with the driving action and it is therefore possible to execute appropriate driving control that follows the actual situation. In general, an occupant who has driving experience changes the viewpoint and field of view in accordance with the situation and adjusts the determination result in accordance with the situation. In one or more embodiments of the present invention, the detection information is acquired in accordance with the detection condition corresponding to the driving action defined in the driving plan, and the driving plan is set or revised on the basis of the detection information. This can suppress the uncomfortable feeling given to the occupants who recognize the change in the situation. According to the scheme of setting the detection condition corresponding to the driving action defined previously, the driving plan can be created to respond to changes in the situation on a case-by-case basis and it is therefore possible to pass through complicated scenes such as intersections smoothly. Moreover, appropriate detection information can be acquired to execute the detection process and the like for objects on the basis of the detection information with an appropriate amount of information because the detection condition corresponding to the driving action is applied rather than applying a uniform detection condition. In other words, it is possible to suppress the acquisition of excessive detection information and execute the detection process and the like for objects on the basis of the detection information with a minimum amount of information. Setting of an appropriate detection condition allows the system resources to be used efficiently. In the autonomous driving control technology on complicated traffic roads such as intersections, while the information processing load is enormous, the processing delay is not allowed and is an important technical problem. If the determination is delayed even for a moment, a situation may occur in which the vehicle makes a stop in an intersection. Appropriately setting the detection condition in accordance with the driving action in an event can reduce the load of information processing and also contribute to an increase in the processing speed.

Methods of setting the detection condition will be specifically described below with reference to the figures. As the contents of the driving actions, "Go" is indicated by a "circle" sign of "GO" or text "Go" and "Stop" is indicated by an "X" sign of "No GO" or text "No Go".

FIRST SETTING EXAMPLE

A first setting example will be described with reference to FIG. 6A and FIG. 6B. The events PA, PB, and PC illustrated in FIG. 6A and FIG. 6B are common events.

Figure 6A:
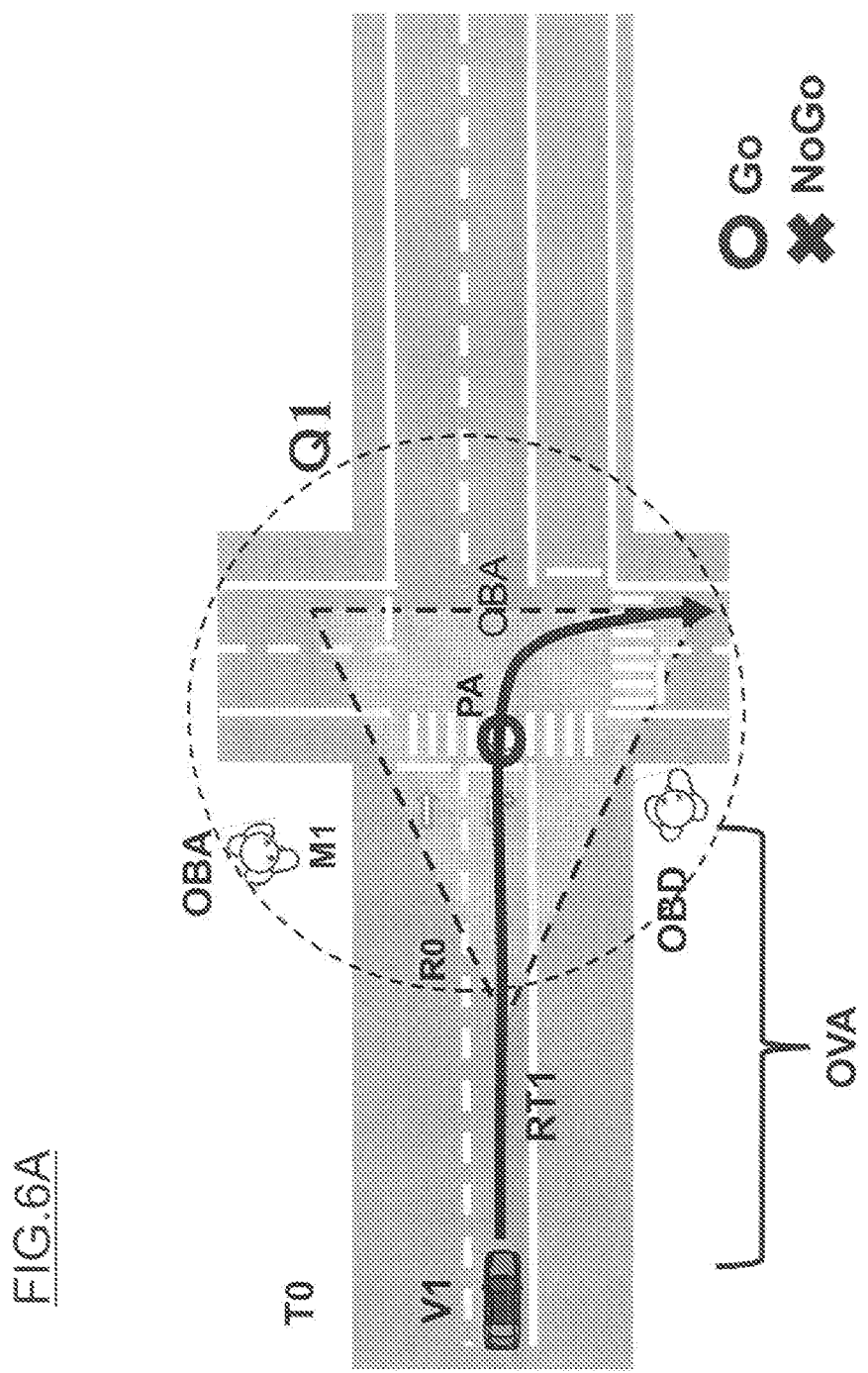
FIG. 6A is a first diagram for describing a first example of a method of determining a detection condition.

FIG. 6A is a diagram illustrating a detection range R0 at timing T0 and FIG. 6B is a diagram illustrating a detection range R1 at timing T1 after the timing T0. The detection ranges R0 and R1 as referred to herein may be detection ranges of the sensors 260 or may also be ranges in which the processor 11 detects an object OB. In this example, the region Q1 of the intersection P will be described as a scene in which the driving control is executed. At both the timings T0 and T1, the vehicle V1 travels in a section OVA that is within a predetermined distance on the upstream side of the event PA. At both the timings T0 and T1, the processor 11 calculates the driving action in the common event PA and sets the detection condition for the event PA.

As illustrated in FIG. 6A, the vehicle V1 to be controlled travels along a route RT1 for passing through the intersection Q1. The vehicle V1 passes through the event PA defined at a point PA (denoted by the same character as that of the event). A pedestrian M1 that is an object OBA exists in the vicinity of a crosswalk that is the event PA which the vehicle V1 encounters earlier. The processor 11 determines that the distance between the pedestrian M1 and the crosswalk is not less than a predetermined distance, and determines that the driving action in the event PA is "Go."

As illustrated in FIG. 6B, the vehicle V1 to be controlled travels along the route RT1. The processor 11 monitors the movement of an object over time. The pedestrian M1 who was not evaluated as an object at the timing T0 has moved and entered the crosswalk at the timing T1. The processor 11 determines that the distance between the pedestrian M1 and the crosswalk is less than the predetermined distance, and determines that the driving action in the event PA is "Stop."

The processor 11 sets the first detection condition when the driving action in the event PA is "Go" to a detection condition for detecting an object with a relatively short time to arrival at the event PA as compared with the second detection condition when the driving action in the event PA is "Stop." When the driving action of the vehicle V1 is "Go," the time to arrival at the event PA is short. In such a case, it suffices that the vehicle V1 can recognize an object OB that arrives at the event PA in a short time. That is, when the driving action of the vehicle V1 is "Go," the detection process is performed to exclude an object OB that exists at a position from which the object OB does not arrive at the event PA within a predetermined time.

The object OB with a short time to arrival can be determined on the basis of a factor that the distance between the event PA and the object OB is short or the speed of the object OB is high. The processor 11 sets the first detection condition when the driving action in the event PA is "Go" to a detection condition in which the detection range for detecting an object OB is relatively narrow as compared with the second detection condition when the driving action in the event PA is "Stop." The size of the detection range may be evaluated on the basis of the area of the detection region, the length along the traveling direction of the vehicle V1, or the length along the vehicle width direction of the vehicle V1. From the same viewpoint, the processor 11 may set the first detection condition when the driving action in the event PA is "Go" to a detection condition for extracting an object OB with a relatively high approach speed to the event PA as compared with the second detection condition when the driving action in the event PA is "Stop."

To obtain a detection condition in which the detection range for detecting an object OB is relatively narrow, the processor 11 adjusts a travel trajectory on the route along which the vehicle V1 travels. The processor 11 sets the first detection condition when the driving action in an event is going to a detection condition in which the travel trajectory of the vehicle is changed so that the detection range for detecting an object is relatively narrow as compared with the second detection condition when the driving action in the event is stopping.

The detection range during the travel may include a blind spot/blind area (occlusion). It cannot be said that such a blind area is practically a detection range because an object cannot be detected in the blind area, so the substantial detection range is narrow. When the driving action in an event is "Go," the processor 11 accepts even a state in which the detection range includes occlusion to narrow the detection range, and consequently sets the travel trajectory of the vehicle so that the detection range for detecting an object becomes relatively narrow. That is, regardless of the presence of occlusion, the processor 11 calculates an optimum reference movement trajectory (route) in each lane included in the route to the destination, and applies the travel trajectory to the autonomous driving control. The reference movement trajectory (route) in the autonomous driving process includes any of a trajectory located approximately at the center of a travel lane, a trajectory in which the included curvatures are not more than a predetermined value, or a trajectory in which the change amounts of the included curvatures are not more than a predetermined value.

Thus, when the driving action is "Go," an object OB that is closer to the event PA or has a shorter time to arrival at the event PA can be selectively detected than when the driving action is "Stop." When the driving action of the vehicle V1 is "Go," the time for the vehicle V1 to arrive at the event PA is relatively shorter than that when the driving action is "Stop." In such a case, it is appropriate to intensively monitor an existing object OB while limiting to a vicinity range in which the distance to the event PA is less than a first predetermined value or the time to arrival at the event PA is less than another first predetermined value. By switching the detection condition, it is possible to exclude, from determination objects, an object OB existing in a distant range in which the distance to the event PA is not less than the first predetermined value and the time to arrival at the event PA is not less than the other first predetermined value. Unnecessary detection information can be prevented from being acquired while maintaining the detection accuracy for an object OB. As a result, the calculation load can be reduced and system resources can be used effectively.

SECOND SETTING EXAMPLE

A second setting example will be described with reference to FIG. 7A and FIG. 7B. The events PA, PB, and PC illustrated in FIG. 7A and FIG. 7B are common events.

Figure 7A:
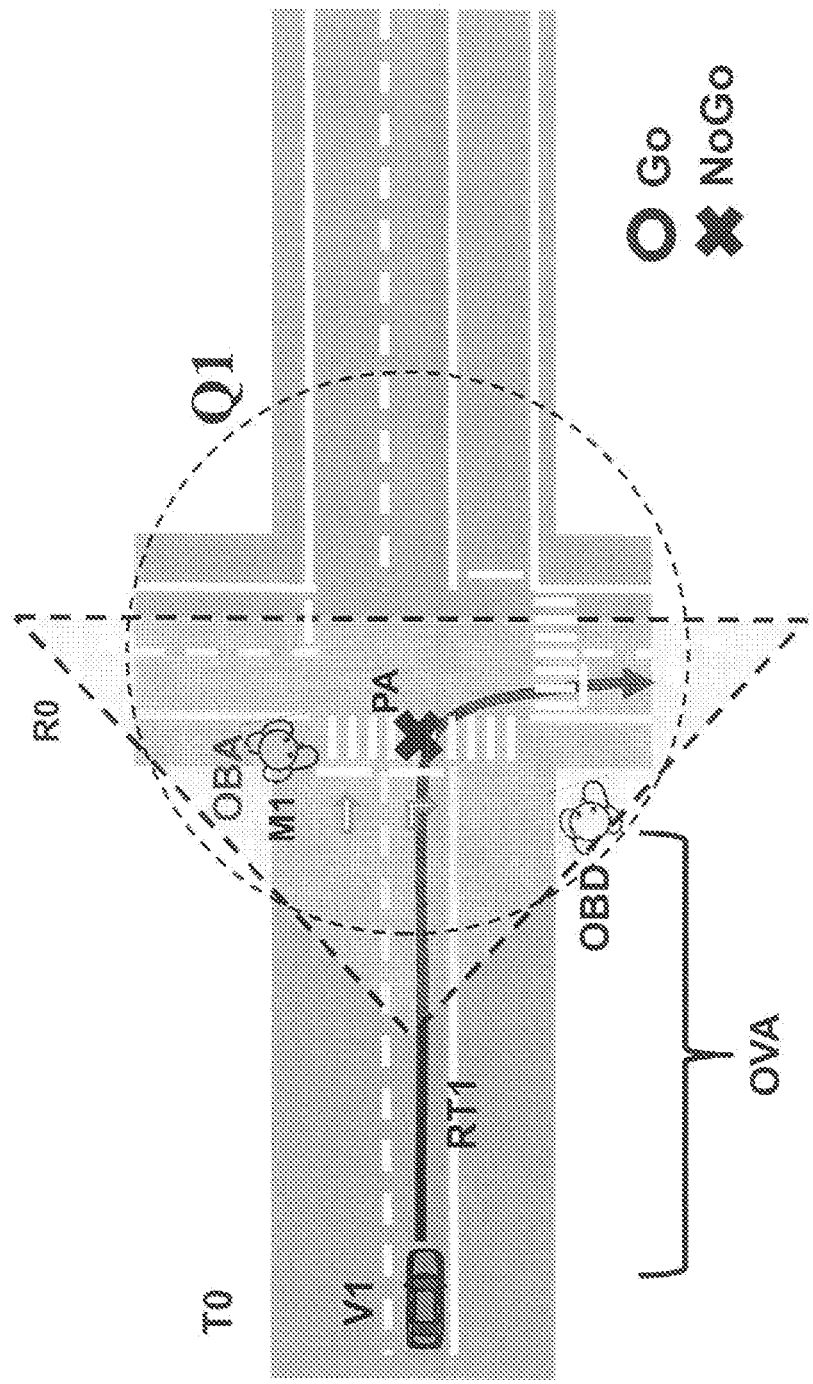
FIG. 7A is a first diagram for describing a second example of the method of determining a detection condition.
Figure 7B:
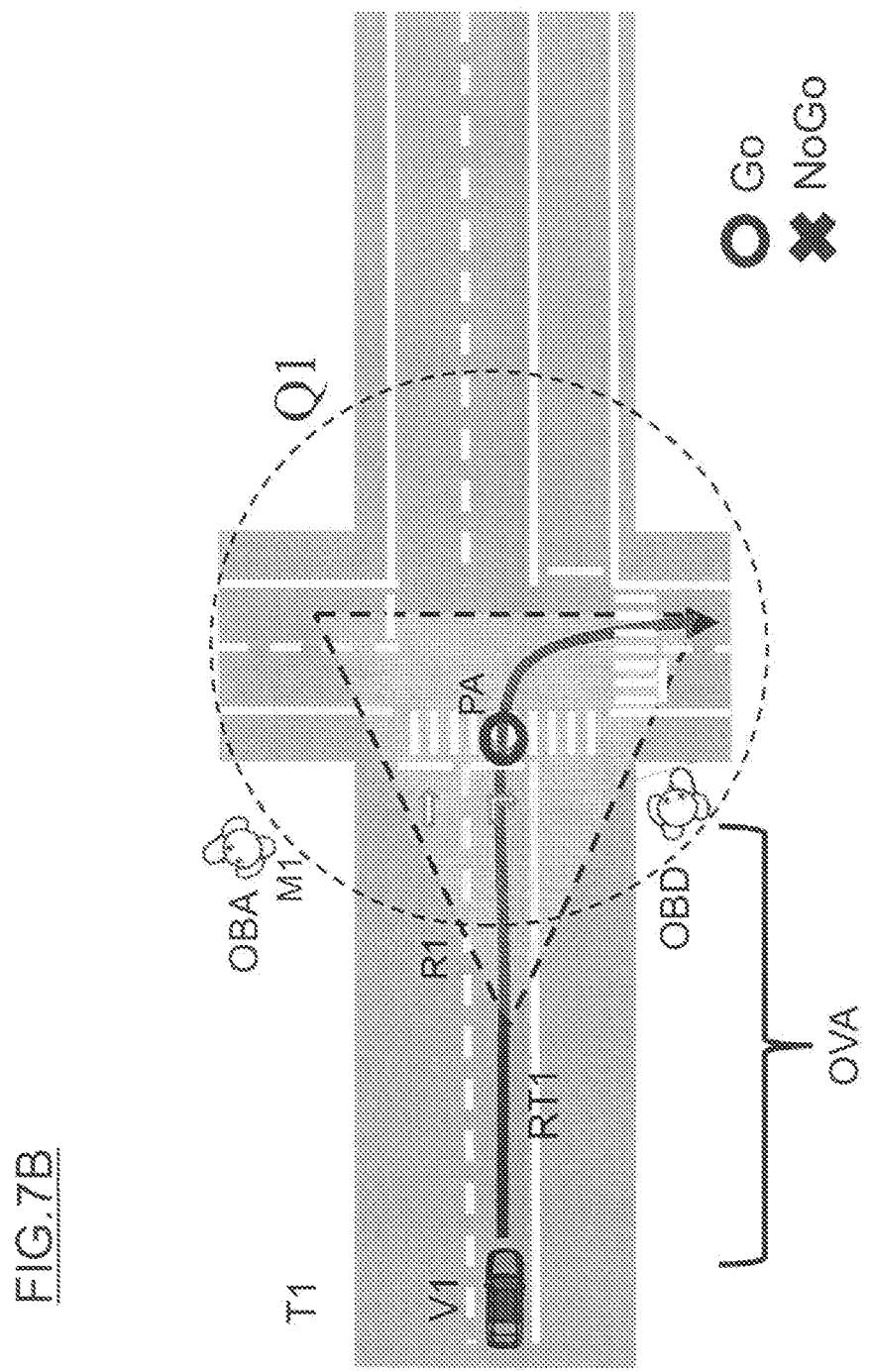
FIG. 7B is a second diagram for describing the second example of the method of determining a detection condition.

FIG. 7A is a diagram illustrating a detection range R0 at timing T0 and FIG. 7B is a diagram illustrating a detection range R1 at timing T1 after the timing T0. The detection ranges R0 and R1 as referred to herein may be detection ranges of the sensors 260 or may also be ranges in which the processor 11 detects an object OB. In this example, the region Q1 of the intersection P will be described as a scene in which the driving control is executed. At both the timings T0 and T1, the vehicle V1 travels in a section OVA that is within a predetermined distance on the upstream side of the event PA. At both the timings T0 and T1, the processor 11 calculates the driving action in the common event PA and sets the detection condition for the event PA.

As illustrated in FIG. 7A, the vehicle V1 to be controlled travels along a route RT1 for passing through the intersection Q1. The vehicle V1 passes through the event PA defined at a point PA (denoted by the same character as that of the event). A pedestrian M1 that is an object OBA is moving along a crosswalk that is the event PA which the vehicle V1 encounters earlier. The processor 11 determines that the distance between the pedestrian M1 and the crosswalk is less than a predetermined distance, and determines that the driving action in the event PA is "Stop."

As illustrated in FIG. 7B, the vehicle V1 to be controlled travels along the route RT1. The processor 11 monitors the movement of an object over time. The pedestrian M1 who was walking along the crosswalk at the timing T0 has moved away from the crosswalk at the timing T1. The processor 11 determines that the distance between the pedestrian M1 and the crosswalk is not less than the predetermined distance, and determines that the driving action in the event PA is "Go."

The processor 11 sets the second detection condition when the driving action in the event PA is "Stop" to a detection condition for detecting an object with a relatively long time to arrival at the event PA as compared with the first detection condition when the driving action in the event PA is "Go." When the driving action of the vehicle V1 is "Stop," the time to arrival at the event PA is long. In such a case, the vehicle V1 monitors not only an object OB that arrives at the event PA in a short time but also a distant objet OB. It can be taken into account that the pedestrian OBD illustrated in FIG. 7B enters the crosswalk before the vehicle V1 turns right in the intersection as the speed of the vehicle V1 decreases due to the driving action of "Stop" of the vehicle V1. That is, the first detection condition is a condition for detecting an object OB with a time to arrival within a predetermined time T1, but when the driving action of the vehicle V1 is "Stop," the second detection condition is set to a condition for detecting an object OB with a time to arrival within a predetermined time T2 (>T1). The detection condition can thus be set in accordance with the necessity of observing far away when the driving action is "Stop."

The object OB with a long time to arrival can be determined on the basis of a factor that the distance between the event PA and the object OB is long or the speed of the object OB is low. The processor 11 sets the second detection condition when the driving action in the event PA is "Stop" to a detection condition in which the detection range for detecting an object OB is relatively wide as compared with the first detection condition when the driving action in the event PA is "Go." The definition of the size of the detection range is as described above. In a case in which the length of the detection range R0 in the traveling direction of the vehicle is increased, the detection range R0 may exceeds the detection ranges of the sensors 260. In such a case, the detection information of objects may be acquired from a detection device provided on a roadside via the communication device 30.

The processor 11 may set the second detection condition when the driving action in the event PA is "Stop" to a detection condition for extracting an object OB with a relatively low approach speed to the event PA as compared with the first detection condition when the driving action in the event PA is "Go."

To obtain a detection condition in which the detection range for detecting an object OB is relatively wide, the processor 11 adjusts a travel trajectory on the route along which the vehicle V1 travels. The processor 11 sets the second detection condition when the driving action in an event is stopping to a detection condition in which the travel trajectory of the vehicle is changed so that the detection range for detecting an object is relatively wide as compared with the first detection condition when the driving action in the event is going. The processor 11 changes the travel trajectory including positions (positions in the road width direction/positions in the traveling direction) in the lane which is included in the common first route to the destination, and calculates a changed travel trajectory. Adjustment of the travel trajectory includes adjusting the timing when passing through each point included in the route. By adjusting the timing when passing through each point included in the route, the distance to an object located ahead can be adjusted. One or more curvatures of the route after the adjustment are made less than a predetermined curvature. This is because the driving control with a large change amount of steering should be avoided.

In the autonomous driving process for the vehicle, the processor 11 calculates an optimum reference movement trajectory (route) in each lane included in the route to the destination. The reference movement trajectory (route) refers to a trajectory located approximately at the center of a travel lane, a trajectory in which the included curvatures are not more than a predetermined value, and/or a trajectory in which the change amounts of the included curvatures are not more than a predetermined value. The processor 11 applies the reference movement trajectory to move the vehicle in an ideal situation and applies a trajectory that is obtained by modifying the reference movement trajectory in response to the detected actual situation, to move the vehicle.

The detection range in the detection process may include a blind area (occlusion). It cannot be said that such a blind area is practically a detection range because the blind area is undetectable. Here, a region excluding the blind area will be described as the detection range. When the detection range includes a blind area, the region of the blind area has to be narrowed to widen the substantial detection range, and the processor 11 adjusts the travel route of the vehicle V1 so as to reduce the area of the blind area region. In a first example, a preceding vehicle shades the detection range ahead in a curve portion of the route, so the processor 11 calculates a travel trajectory including positions shifted right and left so as to avoid the preceding vehicle along the road width direction and controls the vehicle to travel on the changed travel trajectory. It is preferred to shift the travel trajectory outward in the curve portion. In a second example, when the position of a stop line is directly below a traffic signal, the subject vehicle shades the detection range including the traffic signal ahead, so the processor 11 calculates a travel trajectory including positions shifted from the stop line to the upstream side in the traveling direction and controls the vehicle to travel on the changed travel trajectory. In a third example, when a preceding vehicle shades the detection range ahead on a straight path, the processor 11 calculates a changed travel trajectory including positions separated from the preceding vehicle by a predetermined distance and controls the vehicle to travel on the travel trajectory. In a fourth example, when a preceding vehicle shades the detection range ahead on a straight path, the processor 11 calculates a travel trajectory including positions at which the back of the preceding vehicle can be recognized, and controls the vehicle to travel on the changed travel trajectory. As a result, a detection range with reduced occlusion can be set. The change of the travel trajectory allows the viewpoint (sensor position or camera position) in the detection condition to be adjusted.

The processor 11 sets the first detection condition applied when the driving action in the event PA is changed from "Stop" to "Go" to a detection condition in which the travel trajectory of the vehicle is changed so that the detection range for detecting an object is relatively narrow as compared with the second detection condition when the driving action in the event is stopping. In this case, the travel trajectory changed when a determination is made that the driving action in the event PA is "Stop" is changed back to the original trajectory. For example, the travel trajectory in which the lateral positions are changed to narrow the blind area region is changed to a travel trajectory in which the lateral positions are changed back to the original lateral positions (center positions).

Thus, when the driving action is "Stop," an object OB that is farther from the event PA or has a longer time to arrival at the event PA can be selectively detected than when the driving action is "Go." When the driving action of the vehicle V1 is "Stop," the time for the vehicle V1 to arrive at the event PA is relatively longer than that when the driving action is "Go." In such a case, the state of an object OB is highly likely to change before the vehicle V1 arrives at the event PA and it is thus appropriate to widely monitor the object OB existing in a vicinity range in which the distance to the event PA is less than a second predetermined value (>first predetermined value) or the time to arrival at the event PA is less than another second predetermined value (>another first predetermined value). By switching the detection condition, the determination object can be made as an object OB existing in a relatively distant range in which the distance to the event PA is the first predetermined value or more and less than the second predetermined value or the time to arrival at the event PA is the other first predetermined value or more and less than the other second predetermined value. The processor 11 takes into account the situation in which the time for the vehicle V1 to arrive at the event PA becomes relatively long, and monitors a wide range including an object OB that may move during that time. In the second detection condition, an object OB in a range that was excluded in the first detection condition is widely monitored. As a result, the detection information in a range necessary for a scene in which the driving action is "Stop" can be acquired.

THIRD SETTING EXAMPLE

A third setting example will be described with reference to FIG. 8A and FIG. 8B. The events PA, PB, and PC illustrated in FIG. 8A and FIG. 8B are common events.

Figure 8A:
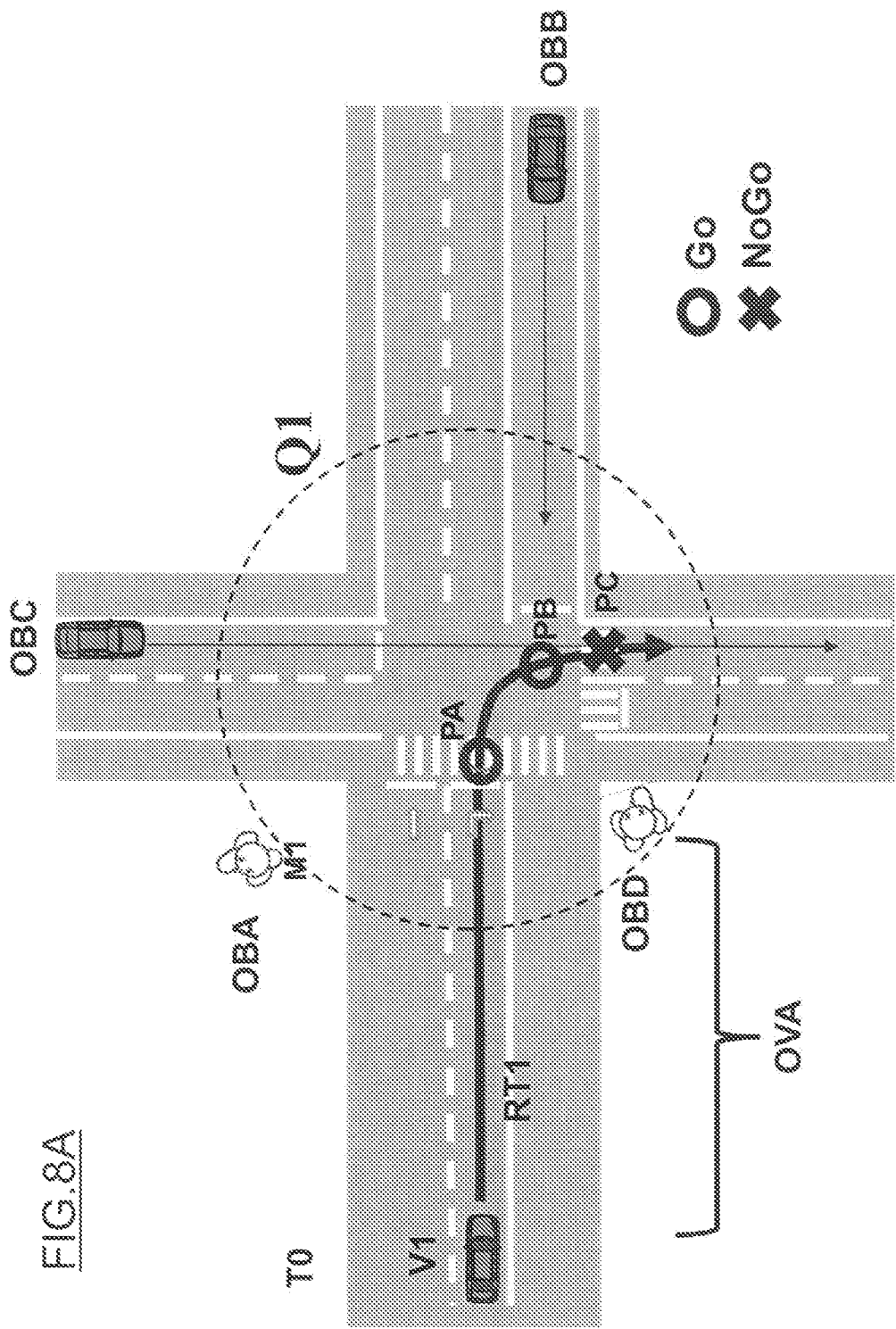
FIG. 8A is a first diagram for describing a third example of the method of determining a detection condition.
Figure 8B:
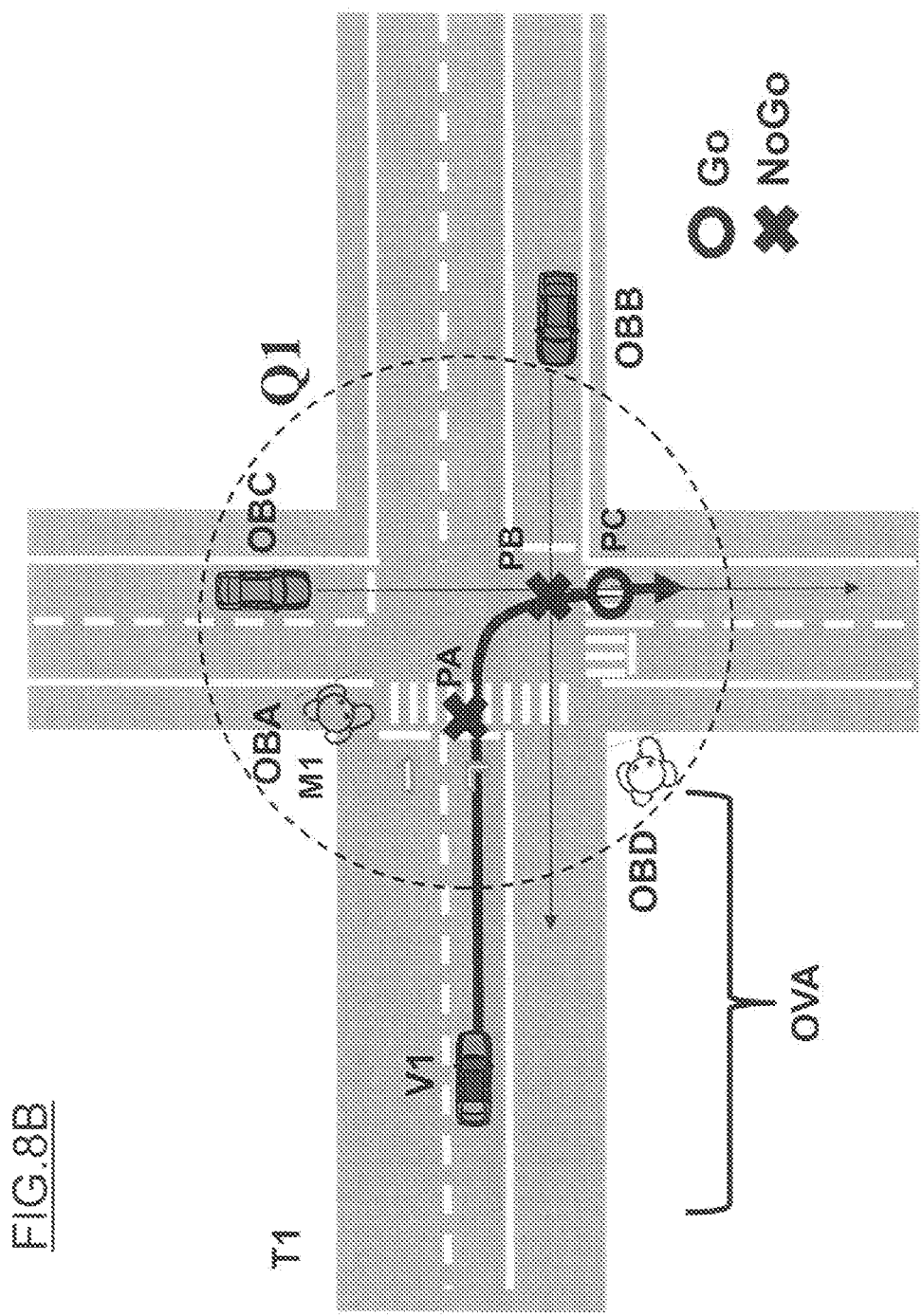
FIG. 8B is a second diagram for describing the third example of the method of determining a detection condition.

FIG. 8A is a diagram illustrating the driving action at timing T0 and FIG. 8B is a diagram illustrating the driving action at timing T1 after the timing T0. As illustrated in FIG. 8A, the vehicle V1 turns right at the intersection. As illustrated in the figure, in the event PA which is a crosswalk and the event PB which crosses the second route, the driving action of "Go" is defined because no objects to contact were detected. The driving action of "Stop" is defined after the right turn in the event PC before exiting the intersection because the vehicle comes close to another vehicle OBC by a predetermined distance or less in the event PC.

As illustrated in FIG. 8B, a pedestrian OBA enters the crosswalk at the timing T1. The processor 11 changes the driving action in the event PA to "Stop." As the driving action in the event PA is changed to "Stop," the vehicle V1 decelerates, so the time to arrival at each of the events PA, PB, and PC increases. As a result, the driving action in the event PB is made to "Stop" because the possibility of contact with an object OBB in the event PB increases. In addition, the driving action in the event PC is made to "Go" because an object OBC passes through the event PB prior to the vehicle V1. Thus, the change of the driving action in the event PA may cause the driving actions in the events subsequent to the event PA to change.

The processor 11 sets the second detection condition when the driving action in an event is "Stop" to a detection condition in which the probability of determination that an object OB comes into contact with the vehicle V1 is set high as compared with the first detection condition when the driving action in the event is "Go." Depending on the attribute of an object OB (such as a vehicle, a two-wheel vehicle, or a pedestrian), the degree of freedom in the moving direction and the variation (range value) of the moving speed are different. When the driving action is "Stop," the processor 11 sets a high probability that the moving direction of the object OB is the direction of the vehicle V1 and sets the detection condition such that the probability that the object OB comes into contact with the vehicle V1 is calculated to be high. When the driving action is "Stop," the processor 11 sets a high probability that the moving speed of the object OB falls within a speed range in which the object OB comes into contact with the vehicle V1 in the event and sets the detection condition such that the probability that the object OB comes into contact with the vehicle V1 is calculated to be high.

The processor 11 sets the second detection condition when the driving action in an event is stopping to a detection condition in which the threshold applied as the detection condition when detecting an object OB is high as compared with the first detection condition when the driving action in the event is "Go."

When the driving action in an event is "Stop," the possibility that the vehicle V1 and an object come close to each other in the event is reduced, and an object of interest can therefore be appropriately detected in accordance with the content of the driving action in the event.

FOURTH SETTING EXAMPLE

A fourth setting example will be described with reference to FIG. 9A and FIG. 9B. The events PA, PB, and PC illustrated in FIG. 9A and FIG. 9B are common events.

Figure 9B:
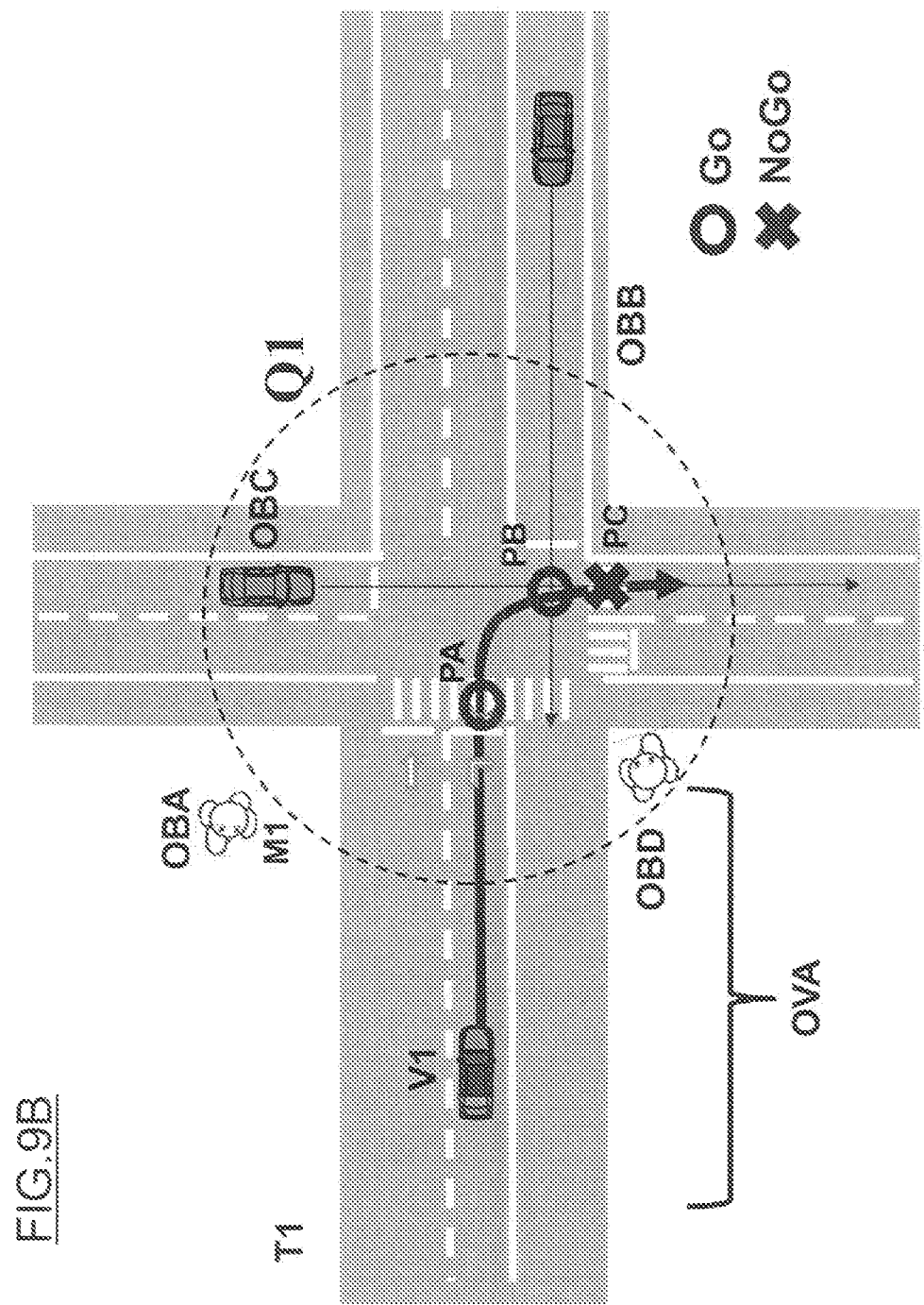
FIG. 9B is a second diagram for describing the fourth example of the method of determining a detection condition.

FIG. 9A is a diagram illustrating the driving action at timing T0 and FIG. 9B is a diagram illustrating the driving action at timing T1 after the timing T0. As illustrated in FIG. 9A, the vehicle V1 turns right in the intersection. As illustrated in the figure, in each of the event PA which is a crosswalk and the event PB which crosses the second route, the driving action of "Stop" is defined because an object to contact was detected. The driving action of "Go" is defined after the right turn in the event PC before exiting the intersection because another vehicle OBC passes through the event PC prior to the vehicle V1.

As illustrated in FIG. 9B, the pedestrian OBA moves away from the crosswalk at the timing T1. The processor 11 changes the driving action in the event PA to "Go." As the driving action in the event PA is changed to "Go," the vehicle V1 maintains the current speed or accelerates, so the time to arrival at each of the events PA, PB, and PC decreases. As a result, the object OBB does not arrive at the event PB at the timing when the vehicle V1 arrives at the event PB; therefore, the possibility that the object OBB and the vehicle V1 come into contact with each other in the event PB decreases, and the driving action in the event PB is made to "Go." On the other hand, the time to arrival at the event PC also decreases and the vehicle V1 arrives at the PC at the timing when the object OBC arrives at the event PC; therefore, the possibility that the object OBC and the vehicle V1 come into contact with each other in the event PC increases, and the driving action in the event PC is made to "Stop." Thus, the change of the driving action in the event PA may cause the driving actions in the events subsequent to the event PA to change.

The processor 11 sets the first detection condition when the driving action in an event is "Go" to a detection condition in which the probability of determination that an object OB comes into contact with the vehicle V1 is set low as compared with the second detection condition when the driving action in the event is "Stop." Depending on the attribute of an object OB (such as a vehicle, a two-wheel vehicle, or a pedestrian), the degree of freedom in the moving direction and the variation (region value) of the moving speed are different. When the driving action is "Go," the processor 11 sets a low probability that the moving direction of the object OB is the direction of the vehicle V1 and sets the detection condition such that the probability that the object OB comes into contact with the vehicle V1 is calculated to be low. When the driving action is "Go," the processor 11 sets a low probability that the moving speed of the object OB falls within a speed range in which the object OB comes into contact with the vehicle V1 in the event and sets the detection condition such that the probability that the object OB comes into contact with the vehicle V1 is calculated to be low. The driving action in the event PA is "Go" and, therefore, as previously described, a detection condition capable of detecting an object with a short time to arrival at the event PA may be set, such as by narrowing the detection range.

The processor 11 sets the first detection condition when the driving action in an event is "Go" to a detection condition in which the threshold applied as the detection condition when detecting an object OB is low as compared with the second detection condition when the driving action in the event is "Stop."

When the driving action in an event is "Go," an object OB with a low possibility of coming close to the vehicle V1 in the event can also be considered as the object. An object of interest can be appropriately detected in accordance with the content of the driving action in the event.

FIFTH SETTING EXAMPLE

A fifth setting example will be described with reference to FIG. 10A and FIG. 10B. The events PA, PB, and PC illustrated in FIG. 10A and FIG. 10B are common events.

Figure 10A:
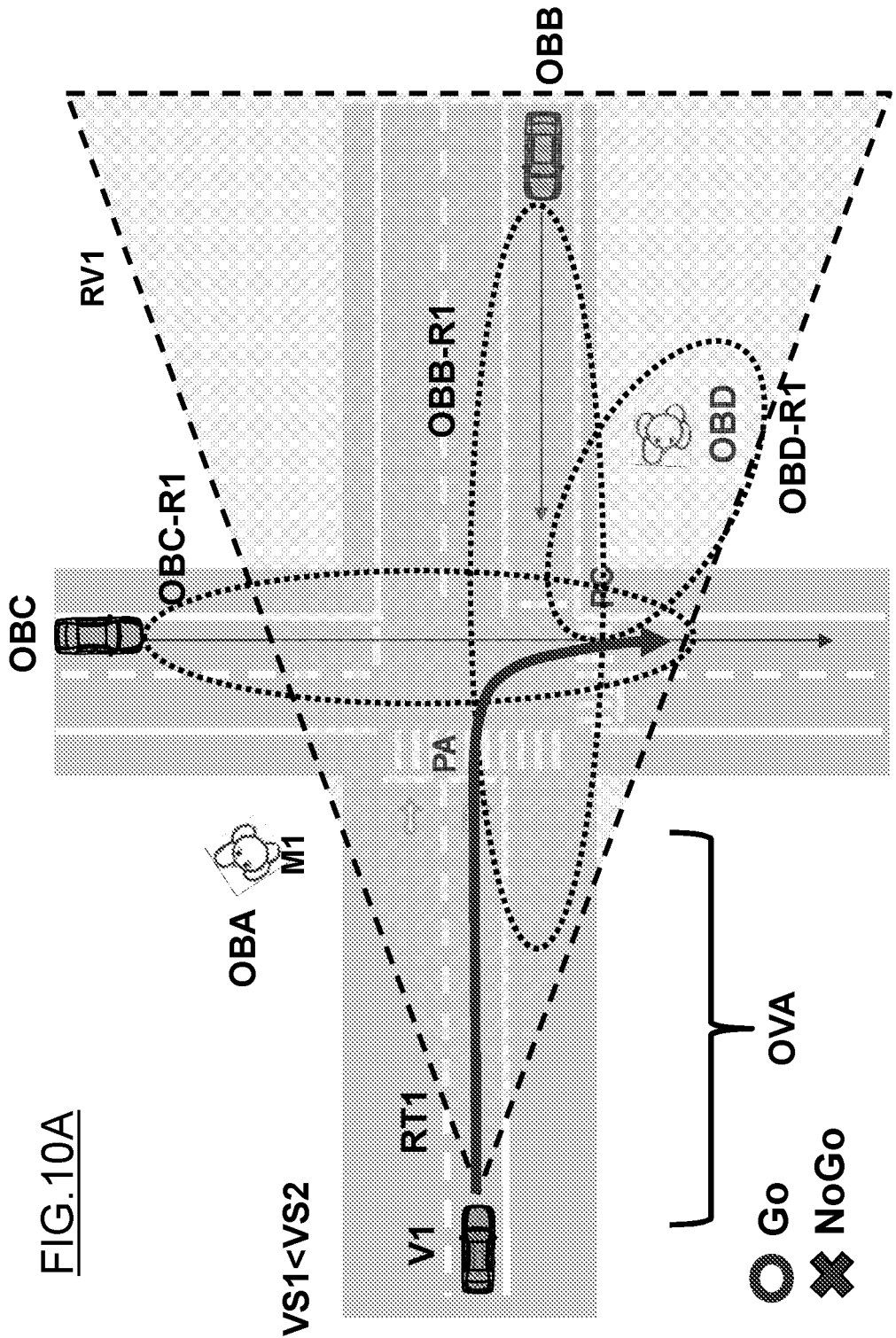
FIG. 10A is a first diagram for describing a fifth example of the method of determining a detection condition.
Figure 10B:
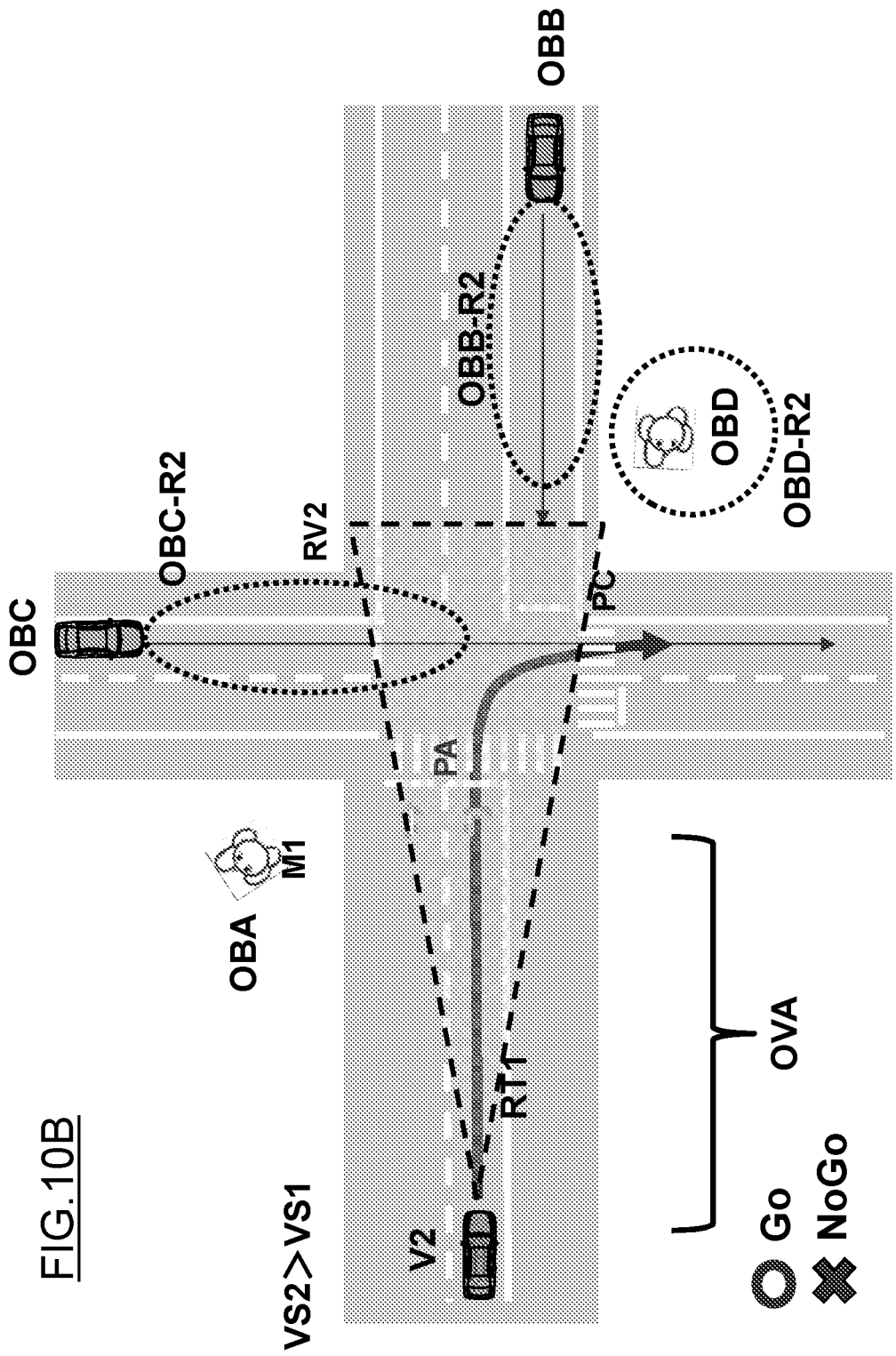
FIG. 10B is a second diagram for describing the fifth example of the method of determining a detection condition.

FIG. 10A is a diagram illustrating a range RV1 in which an object OB is detected when the vehicle speed of the vehicle V1 to be controlled is VS1 (<VS2), which is a relatively low speed, and FIG. 10B is a diagram illustrating a range RV2 in which an object OB is detected when the vehicle speed is VS2 (>VS1). The ranges RV1 and RV2 as referred to herein are not the detection ranges of the sensors 260 but the ranges in which the processor 11 detects an object OB.

The processor 11 sets a detection condition for detecting an object with a shorter time to arrival at an event as the vehicle speed of the vehicle V1 is higher. When the speed of the vehicle V1 is relatively low, an object OB is detected in a wide range, as illustrated in FIG. 10A, in order to detect an object with a relatively long time to arrival at an event. When the speed of the vehicle V1 is relatively high, an object OB is detected in a narrow range, as illustrated in FIG. 10B, in order to detect an object with a relatively shorter time to arrival at an event than when the speed is relatively low.

When the speed of the vehicle V1 is relatively low, the estimation range for the moving speed of an object is set wide (the dispersion of the moving speed is set wide/the degree of dispersion is set large) to determine the possibility of contact with the object. By setting the estimation range for the moving speed of an object to be wide, the probability of contact with the object is calculated high. Through this setting, at the time of a low speed, the possibility of contact with an object existing at a position far from an event can also be taken into account.

On the other hand, when the speed of the vehicle V1 is relatively high, the estimation range for the moving speed of an object is set narrow (the dispersion of the moving speed is set narrow/the degree of dispersion is set small) to determine the possibility of contact with the object. By setting the estimation range for the moving speed of an object to be narrow, the probability of contact with the object is calculated low. Through this setting, at the time of a high speed, an object existing at a position close to an event can be focused to take into account the possibility of contact with the object.

In FIG. 10A and FIG. 10B, the speed of the vehicle V1 is different. The positions and speeds of objects are common.

In the example illustrated in FIG. 10A, the range in which the existence of an object OBC is estimated is indicated by an existence region OBC-R1, the range in which the existence of an object OBB is estimated is indicated by an existence region OBB-R1, and the range in which the existence of an object OBD is estimated is indicated by an existence region OBD-R1. In the example illustrated in FIG.

10A, the existence regions of the objects OBC, OBB, and OBD belong to the range RV1, so the objects OBC, OBB, and OBD are processed as objects.

In the example illustrated in FIG. 10B, the range in which the existence of an object OBC is estimated is indicated by an existence region OBC-R2, the range in which the existence of an object OBB is estimated is indicated by an existence region OBB-R2, and the range in which the existence of an object OBD is estimated is indicated by an existence region OBD-R2. The existence regions illustrated in FIG. 10B in which the vehicle speed of the vehicle V1 is high are narrower than the existence regions illustrated in FIG. 10A in which the vehicle speed is low. In the example illustrated in FIG. 10B, only the existence region of the object OBC belongs to the range RV2; therefore, only the object OBC is processed as an object and the objects OBB and OBD are not checked as objects.

As the vehicle speed increases, an object with a shorter time to arrival at an event can be selectively detected. The higher the vehicle speed, the shorter the time to arrival at an event may be. In one or more embodiments of the present invention, as the vehicle speed increases, a physical object with a shorter time to arrival at an event can be detected. In other words, it is possible to exclude, from determination objects, an object OB existing in a distant range in which the time to arrival at an event is not less than a predetermined value. Unnecessary detection information can be prevented from being acquired while maintaining the detection accuracy for an object OB. As a result, the calculation load can be reduced and system resources can be used effectively.

Referring again to the flowchart of FIG. 3, when the driving action is determined for the event extracted again after the change of the detection condition, the process proceeds to step S16, in which the driving plan is created again. The driving plan suitable for the situation which changes from moment to moment is executed.

In the subsequent step S17, the driving control is executed on the basis of the created driving plan. The processor 11 operates the vehicle to execute the driving plan via the vehicle controller 210.

The processor 11 calculates a target control value on the basis of an actual X-coordinate value (X-axis is the vehicle width direction) of the subject vehicle V1, a target X-coordinate value corresponding to the current position, and a feedback gain. The target control value relates to a steering angle, a steering angular speed, and other parameters necessary for moving the vehicle V1 on the target X-coordinate value. The processor 11 outputs the target control value to the onboard apparatus 200. The vehicle V1 travels on the target route which is defined by a target lateral position. The processor 11 calculates a target Y-coordinate value (Y-axis is the traveling direction of the vehicle) along the route. The processor 11 compares the current Y-coordinate value and the vehicle speed and acceleration at the current position of the vehicle V1 with the target Y-coordinate value corresponding to the current Y-coordinate value and the vehicle speed and acceleration at the target Y-coordinate value and calculates a feedback gain for the Y-coordinate value on the basis of the comparison results. The processor 11 calculates a target control value for the Y-coordinate value on the basis of the vehicle speed, acceleration, and deceleration corresponding to the target Y-coordinate value and the feedback gain for the Y-coordinate value.

Here, the target control value in the Y-axis direction refers to a control value for each of the operation of drive mechanism (which includes the operation of an internal-combustion engine in the case of an engine car and the operation of an electric motor in the case of an electric car and may further include the torque distribution for an internal-combustion engine and an electric motor in the case of a hybrid car) and the braking operation to achieve the acceleration, deceleration, and vehicle speed corresponding to the target Y-coordinate value. For example, in an engine car, the control function serves to calculate a target amount of intake air (target opening degree of the throttle valve) and a target amount of fuel injection on the basis of values of the current and target acceleration, deceleration, and vehicle speed and send them to the drive device 270. Alternatively, the control function may serve to calculate the acceleration, deceleration, and vehicle speed and send them to the vehicle controller 210, which may calculate a control value for each of the operation of drive mechanism (which includes the operation of an internal-combustion engine in the case of an engine car and the operation of an electric motor in the case of an electric car and may further include the torque distribution for an internal-combustion engine and an electric motor in the case of a hybrid car) and the braking operation to achieve these acceleration, deceleration, and vehicle speed.

The processor 11 outputs the calculated target control value in the Y-axis direction to the onboard apparatus 200. The vehicle controller 210 executes the steering control and drive control to operate the subject vehicle to travel on the target route which is defined by the target X-coordinate value and the target Y-coordinate value. The process is repeated every time the target Y-coordinate value is acquired, and the control value for each of the acquired target X-coordinate values is output to the onboard apparatus 200. In step S18, the vehicle controller 210 executes the driving control instruction in accordance with the command from the processor 11 until the vehicle arrives at the destination.

The driving control apparatus 100 according to one or more embodiments of the present invention is configured and operates as the above and therefore has the following effects.

(1) The driving control method according to one or more embodiments of the present invention includes determining a driving action on the basis of detection information acquired in events in accordance with a detection condition; creating a driving plan in which the determined driving action is defined for each of the events; operating the vehicle to execute a driving control instruction in accordance with the driving plan; and determining the detection condition on the basis of the content of the driving action defined for each of the events.

An appropriate detection condition can be set by determining the detection condition on the basis of the content of the driving action. During the execution of the driving control, the movement of the vehicle to be controlled changes and the situation around also changes. By setting the detection condition in accordance with the driving action, it is possible to accurately perceive objects to be detected during the driving control and the situation change of the objects. Under the new detection condition, objects can be detected in accordance with the driving action and it is therefore possible to execute appropriate driving control that follows the actual situation. According to the scheme of setting the detection condition corresponding to the driving action defined previously, the driving plan can be created to respond to changes in the situation on a case-by-case basis and it is therefore possible to pass through complicated scenes such as intersections smoothly. Moreover, appropriate detection information can be acquired to execute the detection process and the like for objects on the basis of the detection information with an appropriate amount of information because the detection condition corresponding to the driving action is applied rather than applying a uniform detection condition. In other words, it is possible to suppress the acquisition of detection information with an excessive amount of information and execute the detection process and the like for objects on the basis of the detection information with a minimum amount of information. This allows the system resources to be used efficiently.

(2) The driving control method according to one or more embodiments of the present invention includes arranging the extracted events in the order of encounters with the vehicle to create a sequential type of the driving plan in which the driving action is defined for each of the events; and determining the detection condition on the basis of the content of the driving action in a second event which the vehicle encounters next to a first event which the vehicle encounters earlier.

In a sequential driving plan determined once, if any driving action is changed due to the appearance of a new object (another vehicle), other driving actions are also affected. The change of the driving action in an event changes the time for the vehicle to arrive at the event and therefore affects the timing of arrival at each of the events arranged in time series. If the timing of arrival at an event changes, the movement amount of an object also changes, so the situation in each event also changes. For example, when the driving action in the downstream event is making a stop, the vehicle is required at least to decelerate even if the driving action in the upstream event is going. Increase in the time to arrival at an event causes a change in the situation in the event, so the driving action on the upstream side is also affected. The processor 11 foresees the driving action in the relatively downstream event (in the traveling direction) to set the detection condition in the most recent event. Thus, the detection condition in the next event can be foreseen to set the detection condition in the event which the vehicle encounters earlier, and it is therefore possible to set the detection condition suitable for the driving action in the next event. The success rate (completion rate) of the driving plan can be increased because the driving action and driving plan suitable for the situation can be created using the detection information which follows such an appropriate detection condition.

(3) The driving control method according to one or more embodiments of the present invention includes arranging the extracted events in the order of encounters with the vehicle to create a sequential type of the driving plan in which the driving action is defined for each of the events; and determining the detection condition on the basis of the content of the driving action in a second event which the vehicle encounters next to a first event which the vehicle encounters earlier, and the detection condition is switched to the determined detection condition after the vehicle passes through the first event.

The processor 11 determines the detection condition on the basis of the driving action in the second event which the vehicle encounters next to the first event which the vehicle encounters earlier. After the vehicle passes through the first event, the processor 11 switches to the determined detection condition and operates the onboard apparatus 200 to execute the detection process in accordance with the switched detection condition.

The processor 11 can foresee the driving action in the relatively downstream second event (in the traveling direction), set the detection condition early, and execute the detection process in which the new detection condition is applied, immediately after the vehicle passes through the first event. The detection condition suitable for the driving action in the next event can thus be set at appropriate timing. The success rate (completion rate) of the driving plan can be increased because the driving action and driving plan suitable for the situation can be created using the detection information which follows such an appropriate detection condition.

(4) In the driving control method according to one or more embodiments of the present invention, the first detection condition when the driving action in an event is going is set to a detection condition for detecting an object with a relatively short time to arrival at the event as compared with the second detection condition when the driving action in the event is stopping.

It is appropriate to intensively monitor an object OB existing in a vicinity range in which the distance to the event PA is less than a first predetermined value or the time to arrival at the event PA is less than another first predetermined value. By switching the detection condition, it is possible to exclude, from determination objects, an object OB existing in a distant range in which the distance to the event PA is not less than the first predetermined value and the time to arrival at the event PA is not less than the other first predetermined value. Unnecessary detection information can be prevented from being acquired while maintaining the detection accuracy for an object OB. As a result, the calculation load can be reduced and system resources can be used effectively.

(5) In the driving control method according to one or more embodiments of the present invention, the second detection condition when the driving action in an event is stopping is set to a detection condition for detecting an object with a relatively long time to arrival at the event as compared with the first detection condition when the driving action in the event is going.

The state of an object OB is highly likely to change before the vehicle V1 arrives at the event PA and it is thus appropriate to widely monitor the object OB existing in a vicinity range in which the distance to the event PA is less than a second predetermined value (>first predetermined value) or the time to arrival at the event PA is less than another second predetermined value (>another first predetermined value). By switching the detection condition, the determination object can be made as an object OB existing in a relatively distant range in which the distance to the event PA is the first predetermined value or more and less than the second predetermined value or the time to arrival at the event PA is the other first predetermined value or more and less than the other second predetermined value. The processor 11 takes into account the situation in which the time for the vehicle V1 to arrive at the event PA becomes relatively long, and monitors a wide range including an object OB that may move during that time. In the second detection condition, an object OB in a range that was excluded in the first detection condition is widely monitored. As a result, the detection information in a range necessary for a scene in which the driving action is "Stop" can be acquired.

(6) In the driving control method according to one or more embodiments of the present invention, the second detection condition when the driving action in an event is stopping is set to a detection condition in which a travel trajectory of the vehicle is changed so that a detection range for detecting an object is relatively wide as compared with the first detection condition when the driving action in the event is going.

The state of an object OB is highly likely to change before the vehicle V1 arrives at the event PA and it is thus appropriate to widely monitor the object OB existing in a vicinity range in which the distance to the event PA is less than a second predetermined value (>first predetermined value) or the time to arrival at the event PA is less than another second predetermined value (>another first predetermined value). By switching the detection condition, the determination object can be made as an object OB existing in a relatively distant range in which the distance to the event PA is the first predetermined value or more and less than the second predetermined value or the time to arrival at the event PA is the other first predetermined value or more and less than the other second predetermined value. The processor 11 takes into account the situation in which the time for the vehicle V1 to arrive at the event PA becomes relatively long, and monitors a wide range including an object OB that may move during that time. In the second detection condition, an object OB in a range that was excluded in the first detection condition is widely monitored. As a result, the detection information in a range necessary for a scene in which the driving action is "Stop" can be acquired.

(7) In the driving control method according to one or more embodiments of the present invention, the first detection condition when the driving action in an event is going is set to a detection condition in which a travel trajectory of the vehicle is changed so that a detection range for detecting an object is relatively narrow as compared with the second detection condition when the driving action in the event is stopping.

It is appropriate to intensively monitor an object OB existing in a vicinity range in which the distance to the event PA is less than a first predetermined value or the time to arrival at the event PA is less than another first predetermined value. By switching the detection condition, it is possible to exclude, from determination objects, an object OB existing in a distant range in which the distance to the event PA is not less than the first predetermined value and the time to arrival at the event PA is not less than the other first predetermined value. Unnecessary detection information can be prevented from being acquired while maintaining the detection accuracy for an object OB. As a result, the calculation load can be reduced and system resources can be used effectively.

(8) In the driving control method according to one or more embodiments of the present invention, the first detection condition when the driving action in an event is going is set to a detection condition in which a probability of determination that an object comes into contact with the vehicle is set low as compared with the second detection condition when the driving action in the event is stopping.

When the driving action in an event is "Go," an object OB with a reduced possibility of coming close to the vehicle V1 in the event is taken into account. An object of interest can be appropriately detected in accordance with the content of the driving action in the event.(9) In the driving control method according to one or more embodiments of the present invention, the second detection condition when the driving action in an event is stopping is set to a detection condition in which a probability of determination that an object comes into contact with the vehicle is set high as compared with the first detection condition when the driving action in the event is going. In other words, even when the situation of an object is the same, the second detection condition in the case in which the driving action in an event is stopping leads to a detection result that the probability that the object comes into contact with the vehicle is relatively higher than that in the first detection condition.

When the driving action in an event is "Stop," the possibility of coming close to the vehicle V1 in the event is increased to take into account an object OB existing in a wide range. An object of interest can be appropriately detected in accordance with the content of the driving action in the event.

(10) In the driving control method according to one or more embodiments of the present invention, the detection condition is a condition for detecting an object with a shorter time to arrival at an event as the vehicle speed increases. As the vehicle speed increases, an object with a shorter time to arrival at an event can be selectively detected. The higher the vehicle speed, the shorter the time to arrival at an event may be. In one or more embodiments of the present invention, as the vehicle speed increases, a physical object with a shorter time to arrival at an event can be detected. In other words, it is possible to exclude, from determination objects, an object OB existing in a distant range in which the time to arrival at an event is not less than a predetermined value. Unnecessary detection information can be prevented from being acquired while maintaining the detection accuracy for an object OB. As a result, the calculation load can be reduced and system resources can be used effectively.

(11) In the driving control method according to one or more embodiments of the present invention, a determination is made as to whether or not to switch the detection condition, on the basis of a change amount of movement of an object obtained from a change over time of the detection information.

When the change amount of movement of an object is less than a predetermined value, the possibility that the determination of the driving action is changed is low. When the determination of the driving action is not changed, the setting of the detection condition is likely to be maintained. This enables an appropriate determination of changing/maintaining the detection condition and it is thus possible to execute the driving control suitable for the actual situation. This can suppress the uncomfortable feeling given to the occupants due to frequent changes of the detection condition.

(12) The driving control apparatus 100 according to one or more embodiments of the present invention exhibits the same actions and effects as those of the above-described driving control method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Driving control system
100 Driving control apparatus
10 Control device
11 Processor
20 Output device
30 Communication device
200 Onboard apparatus
210 Vehicle controller
220 Navigation device
221 Position detection device
222 Map information
223 Road information 224 Traffic rule information
230 Detection device
231 Camera
232 Radar device
240 Lane-keeping device 241 Camera
242 Road information
250 Output device
251 Display
252 Speaker
260 Sensors
261 Steering angle sensor
262 Vehicle speed sensor
263 Attitude sensor
270 Drive device
271 Braking device
280 Steering device

The invention claimed is:

1. A driving control method executed by a processor configured to control driving of a vehicle, comprising:
acquiring detection information around the vehicle on a basis of a detection condition that can be set for a respective point along a traveling route;
extracting events which the vehicle encounters, on a basis of the detection information;
creating a driving plan in which a driving action is defined for each of the events, the driving action being determined on the basis of the detection information acquired in the events;
operating the vehicle to execute a driving control instruction in accordance with the driving plan; and
determining the detection condition on a basis of content of the driving action defined for each of the events, wherein, when determining the detection condition, a first detection condition is when the driving action in an event is going and a second detection condition is when the driving action in the event is stopping, wherein the first detection condition has less time to arrival at the event as compared with the second detection condition, wherein the first and second detection conditions each have a detection range that comprises a length that extends in a travel direction of the vehicle, a width that is parallel to a vehicle width, and an area based on the width and the length of the detection range, wherein the length of the detection range of the first detection condition is shorter than the length of the detection range of the second detection condition, and wherein the area of the detection range of the first detection condition is smaller than the area of the detection range of the second detection condition.

2. The driving control method according to claim 1, wherein, when determining the detection condition, the detection condition is determined on a basis of content of the driving action defined for each of the events arranged in order of encounters with the vehicle.

3. The driving control method according to claim 1, comprising:
arranging the extracted events in order of encounters with the vehicle to create a sequential type of the driving plan in which the driving action is defined for each of the events; and
determining the detection condition on a basis of content of the driving action in a second event which the vehicle encounters next to a first event which the vehicle encounters earlier.

4. The driving control method according to claim 1, comprising:
arranging the extracted events in order of encounters with the vehicle to create a sequential type of the driving plan in which the driving action is defined for each of the events; and
determining the detection condition on a basis of content of the driving action in a second event which the vehicle encounters next to a first event which the vehicle encounters earlier, wherein the detection condition is switched to the determined detection condition after the vehicle passes through the first event.

5. The driving control method according to claim 1, wherein, when determining the detection condition, a second detection condition when the driving action in an event is stopping is the detection condition for detecting an object with a relatively long time to arrival at the event as compared with a first detection condition when the driving action in the event is going.

6. The driving control method according to claim 1, wherein, when determining the detection condition, a first detection condition when the driving action in an event is going is the detection condition in which a travel trajectory of the vehicle is changed so that a detection range for detecting an object is relatively narrow or is relatively wide as compared with a second detection condition when the driving action in the event is stopping.

7. The driving control method according to claim 1, wherein, when determining the detection condition, a first detection condition when the driving action in an event is going is the detection condition in which a probability of determination that an object comes into contact with the vehicle is set low as compared with a second detection condition when the driving action in the event is stopping.

8. The driving control method according to claim 1, wherein, when determining the detection condition, a second detection condition when the driving action in an event is stopping is the detection condition in which a probability of determination that an object comes into contact with the vehicle is set high as compared with a first detection condition when the driving action in the event is going.

9. The driving control method according to claim 1, comprising:
acquiring a vehicle speed of the vehicle; and
setting the detection condition for detecting an object with a shorter time to arrival at an event as the vehicle speed increases.

10. The driving control method according to claim 1, wherein, when determining the detection condition, a determination is made as to whether or not to switch the detection condition, on a basis of a change amount of movement of an object obtained from a change over time of the detection information.

11. A driving control apparatus comprising:
a processor configured to execute a driving control process,
the processor further configured to execute:
a process of acquiring detection information around a vehicle on a basis of a detection condition that can be set for a respective point along a traveling route;
a process of extracting events which the vehicle encounters, on a basis of the detection information;
a process of creating a driving plan in which a driving action is defined for each of the events on the basis of the detection information acquired in the events;
a process of executing a driving control instruction for the vehicle in accordance with the driving plan; and
a process of determining the detection condition on a basis of content of the driving action defined for each of the events, wherein, when determining the detection condition, a first detection condition is when the driving action in an event is going and a second detection condition is when the driving action in the event is stopping, wherein the first detection condition has less time to arrival at the event as compared with the second detection condition, wherein the first and second detection conditions each have a detection range that comprises a length that extends in a travel direction of the vehicle, a width that is parallel to a vehicle width, and an area based on the width and the length of the detection range, wherein the length of the detection range of the first detection condition is shorter than the length of the detection range of the second detection condition, and wherein the area of the detection range of the first detection condition is smaller than the area of the detection range of the second detection condition.

12. A driving control method executed by a processor configured to control driving of a vehicle, comprising:
   acquiring detection information around the vehicle on a basis of a detection condition that can be set for a respective point along a traveling route;
   extracting events which the vehicle encounters, on a basis of the detection information;
   creating a driving plan in which a driving action is defined for each of the events, the driving action being determined on the basis of the detection information acquired in the events;
   operating the vehicle to execute a driving control instruction in accordance with the driving plan; and
   determining the detection condition on a basis of content of the driving action defined for each of the events, wherein, when determining the detection condition, a second detection condition when the driving action in an event is stopping is the detection condition in which a travel trajectory of the vehicle is changed so that a detection range for detecting an object is different as compared with a first detection condition when the driving action in the event is going, wherein the first and second detection conditions each have a detection range that comprises a length that extends in a travel direction of the vehicle, a width that is parallel to a vehicle width, and an area based on the width and the length of the detection range, wherein the length of the detection range of the first detection condition is shorter than the length of the detection range of the second detection condition, and wherein the area of the detection range of the first detection condition is smaller than the area of the detection range of the second detection condition.

13. The driving control method according to claim 12, wherein, when determining the detection condition, the detection condition is determined on a basis of content of the driving action defined for each of the events arranged in order of encounters with the vehicle.

14. The driving control method according to claim 12, comprising:
   arranging the extracted events in order of encounters with the vehicle to create a sequential type of the driving plan in which the driving action is defined for each of the events; and
   determining the detection condition on a basis of content of the driving action in a second event which the vehicle encounters next to a first event which the vehicle encounters earlier.

15. The driving control method according to claim 12, comprising:
   arranging the extracted events in order of encounters with the vehicle to create a sequential type of the driving plan in which the driving action is defined for each of the events; and
   determining the detection condition on a basis of content of the driving action in a second event which the vehicle encounters next to a first event which the vehicle encounters earlier, wherein the detection condition is switched to the determined detection condition after the vehicle passes through the first event.

16. The driving control method according to claim 12, wherein, when determining the detection condition, a first detection condition when the driving action in an event is going is the detection condition in which a travel trajectory of the vehicle is changed so that a detection range for detecting an object is relatively narrow as compared with a second detection condition when the driving action in the event is stopping.

17. The driving control method according to claim 12, wherein, when determining the detection condition, a first detection condition when the driving action in an event is going is the detection condition in which a probability of determination that an object comes into contact with the vehicle is set low as compared with a second detection condition when the driving action in the event is stopping.

18. The driving control method according to claim 12, wherein, when determining the detection condition, a second detection condition when the driving action in an event is stopping is the detection condition in which a probability of determination that an object comes into contact with the vehicle is set high as compared with a first detection condition when the driving action in the event is going.

19. The driving control method according to claim 12, comprising:
   acquiring a vehicle speed of the vehicle; and
   setting the detection condition for detecting an object with a shorter time to arrival at an event as the vehicle speed increases.

20. The driving control method according to claim 12, wherein, when determining the detection condition, a determination is made as to whether or not to switch the detection condition, on a basis of a change amount of movement of an object obtained from a change over time of the detection information.

* * * * *